(12) United States Patent
Bade et al.

(10) Patent No.: US 12,360,614 B2
(45) Date of Patent: Jul. 15, 2025

(54) POINT-AND-SELECT SYSTEM AND METHODS

(71) Applicant: Doublepoint Technologies Oy, Helsinki (FI)

(72) Inventors: Felix Bade, Helsinki (FI); Daniel Leggat, Helsinki (FI); Jamin Hu, Helsinki (FI); Ville Klar, Helsinki (FI)

(73) Assignee: Doublepoint Technologies Oy, Helsinki (FI)

( * ) Notice: Subject to any disclaimer, the term of this patent is extended or adjusted under 35 U.S.C. 154(b) by 0 days.

(21) Appl. No.: 18/522,375

(22) Filed: Nov. 29, 2023

(65) Prior Publication Data

US 2025/0173005 A1    May 29, 2025

(51) Int. Cl.
*G06F 3/0346*    (2013.01)
*G06F 3/01*    (2006.01)
*A63F 13/245*    (2014.01)

(52) U.S. Cl.
CPC ............ *G06F 3/0346* (2013.01); *G06F 3/012* (2013.01); *G06F 3/013* (2013.01); *G06F 3/017* (2013.01); *A63F 13/245* (2014.09)

(58) Field of Classification Search
CPC ........ G06F 3/0346; G06F 3/012; G06F 3/013; G06F 3/017; A63F 13/245
See application file for complete search history.

(56) References Cited

U.S. PATENT DOCUMENTS

| | | | |
|---|---|---|---|
| 9,235,241 B2 * | 1/2016 | Newham | H04M 1/6066 |
| 11,327,630 B1 * | 5/2022 | Khan | G06T 19/006 |
| 2014/0028539 A1 * | 1/2014 | Newham | G06F 3/017 |
| | | | 345/156 |
| 2020/0379576 A1 | 12/2020 | Chen et al. | |
| 2023/0297167 A1 | 9/2023 | Hu et al. | |

FOREIGN PATENT DOCUMENTS

WO    WO2022166448 A1    8/2022

* cited by examiner

*Primary Examiner* — Peter D McLoone
(74) *Attorney, Agent, or Firm* — Laine IP Oy

(57) ABSTRACT

According to an example aspect of the present invention, there is provided an input device and corresponding method which digitizes and transforms minute hand movements and gestures into a directive ray without interfering with the normal use of one's hands. The device and method may, for example, at least participate in computing the directive ray based on received information from a plurality of sensors, where the sensors are preferably of different types.

26 Claims, 8 Drawing Sheets

POINT-AND-SELECT SYSTEM AND METHODS

FIELD

Various example embodiments of this disclosure relate to a system, at least one wearable apparatus and a method, where the apparatus and method are usable for controlling devices, in particular in the field of computing and extended reality user interface applications. Extended reality, XR, includes augmented reality, AR, virtual reality, VR, and mixed reality, MR.

BACKGROUND

Traditionally, digital devices have been controlled with a dedicated physical controller. For example, a computer can be operated with a keyboard and mouse, a game console with a handheld controller, and a smartphone via a touchscreen. Usually, these physical controllers comprise sensors and/or buttons for receiving inputs from the user based on the user's actions. Such discrete controllers are ubiquitous, but they impede human-machine-interaction by adding a redundant layer of technology between the user's hands and the computation device. Additionally, such dedicated devices are typically only suited for controlling a specific device. Also, such devices may, for example, impede the user, so that the user is unable to use his hand(s) for other purposes when using the control device.

SUMMARY OF THE INVENTION

In view of the above-mentioned issues, improvements are needed in the field of XR user interfaces. A suitable input device, in accordance with the invention disclosed herein, directly digitizes and transforms minute hand movements and gestures into machine commands, such as a pointer or cursor ray, without interfering with the normal use of one's hands. The embodiments of the present disclosure may, for example, compute a directive ray based on data received from a plurality of sensors, where the sensors are preferably of different types.

The invention is defined by the features of the independent claims. Some specific embodiments are defined in the dependent claims.

According to a first aspect of the present invention, there is provided a system comprising: a wrist-wearable apparatus comprising: a mounting component, a controller comprising a processing core, at least one memory including computer program code; and a wrist-wearable IMU configured to measure a user, wherein the system is configured to: receive data from the wrist-wearable IMU, the data comprising gravity information, receive data from at least one head sensor configured to measure the user, said data comprising, for example, a head orientation for the user, compute, based on the gravity information and based at least in part on the data received from the head sensor, a yaw component of a directive ray, compute a pitch component of the directive ray, wherein computing the pitch component is based at least in part on the gravity information, and compute the directive ray, wherein the directive ray is based on a combination of the computed yaw component and computed pitch component.

According to a second aspect of the present invention, there is provided a method for computing a directive ray, the method comprising: receiving data from at least one wrist-wearable IMU, the data comprising gravity information, receiving data from at least one head sensor, configured to measure the user, in particular a head orientation for the user, computing, based on the gravity information, and based at least in part on the data received from the head sensor, a yaw component of a directive ray, computing a pitch component of the directive ray, wherein computing the pitch is based at least in part on the received gravity information, and computing a directive ray, wherein the directive ray is based on a combination of the computed yaw component and computed pitch component.

According to a third aspect of the present invention, there is provided a non-transitory computer readable medium having stored thereon a set of computer readable instructions, that when executed on a processor cause the second aspect to be performed or an apparatus comprising the processor to be configured in accordance with the first aspect.

EMBODIMENTS

Figure 1A:
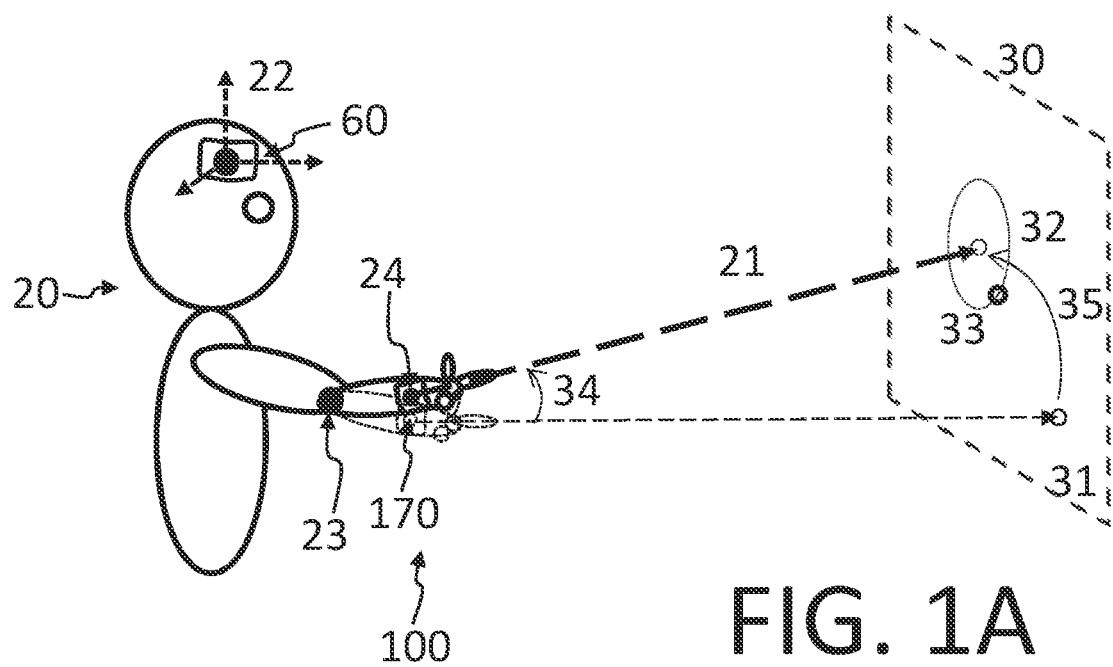
FIG. 1A illustrates a schematic view of an isomorphic directive ray displayed to an user as supported by at least some of the embodiments of the present invention.

When interacting with AR/VR/MR/XR applications, for example when using devices such as smartwatches or extended reality headsets, users need to be able to perform a variety of actions (also known as user actions), such as selecting, dragging and dropping, rotating and dropping, using sliders, and zooming. The present embodiments provide improvements in detecting user actions, which may lead to improved responsiveness when implemented in or by a controller or a system. Said actions may be performed with respect to one or more interactive elements, for example an interactable. A interactable may comprise, for example, a UI slider, a UI switch or a UI button in the user interface A system, wearable apparatuses and a method relating to at least one of computing and/or displaying a directive ray is described herein. The system, the wearable apparatuses and the method may be used for at least one of the following, for example: measurement, sensing, signal acquisition, analysis, user interface tasks. Such a system or at least one apparatus is preferably suitable for a user to wear. The user may control one or more external and/or separate devices using said system or at least one apparatus. An external and/or separate device may be, for example, a personal computer PC, a server, a mobile phone, a smartphone, a tablet device, a smart watch, or any type of suitable electronic device. The control may be in the form of a user interface, UI, or a human-machine interface, HMI. The system may comprise at least one apparatus. The at least one apparatus may comprise one or more sensors. The system may be configured to generate user interface data based on data from said one or more sensors. The user interface data may be used at least in part to allow the user to control the system or at least one second apparatus. The second apparatus may be, for example, at least one of: a personal computer, PC, a server, a mobile phone, a smartphone, a tablet device, a smart watch, or any type of suitable electronic device. A controlled or controllable apparatus may perform at least one of: an application, a game, and/or an operating system, any of which may be controlled by the multimodal apparatus.

A user may perform at least one user action. Typically, the user will perform an action to affect the controllable apparatus and/or the AR/VR/MR/XR application. A user action may comprise, for example, at least one of: a movement, a gesture, an interaction with an object, an interaction with a body part of the user, a null action. An example user action is the "pinch" gesture, where the user touches the tip of the index finger with the tip of the thumb. Another example is a "thumbs up" gesture, where the user extends his thumb, curls his fingers and rotates his hand so that the thumb is pointing upwards. The embodiments are configured to identify (determine) at least one user action, based at least in part on sensor input. Reliable identification of user actions enables action-based control, for example using the embodiments disclosed herein.

A user action may comprise at least one characteristic, termed a user action characteristic and/or an event. Such a characteristic may be, for example, any of the following: temporal, locational, spatial, physiological, and/or kinetic. A characteristic may comprise an indication of a body part of a user, such as a finger of the user. A characteristic may comprise an indication of a movement of the user, such as a hand trajectory of a user. For example, a characteristic may be: middle finger movement. In another example, a characteristic may be: circular movement. In yet another example, a characteristic may be: a time prior to an action, and/or a time after an action. In at least some of the embodiments, a characteristic of a user action is determined, for example by a neural network, based at least in part on sensor data.

In at least some of the embodiments, the system comprises at least one apparatus comprising a mounting component configured to be worn by a user. The at least one apparatus is thus a wearable apparatus. Such a component may be any of the following: a strap, a band, a wristband, a bracelet, a glove, glasses, goggles, a helmet, a cap, a hat, a head band, or similar head gear. For hand mounted embodiments, a strap may be preferred. The mounting component may be attached to and/or formed by another apparatus such as a smartwatch, or form part of a larger apparatus such as a gauntlet, or a headset. In some embodiments, a strap, a band, and/or a wristband has a width of 2 to 5 cm, preferably 3 to 4 cm, more preferably 3 cm. The mounting component may be attached to and/or formed by another apparatus such as a head mounted display, virtual reality VR headset, extended reality XR headset, augmented reality AR headset, or mixed reality MR headset.

In the embodiments, signals are measured by at least one sensor. Said sensor may comprise or be connected to a processor and memory, where the processor may be configured so that the measuring is performed. Measuring may be termed sensing or detecting. Measuring comprises, for example, detecting changes in at least one of: the user, the environment, the physical world. Measuring may further comprise, for example, applying at least one timestamp to sensed data, transmitting said sensed data (with or without the at least one timestamp).

The embodiments of the present disclosure are configured to measure the position, orientation and movement of the user by using an inertial measurement unit, IMU. The IMU may be configured to provide position information of the at least part of the system or a part of the user's body whereon the IMU is mounted, attached or worn. The IMU may be termed an inertial measurement unit sensor. The IMU comprises a gyroscope. Further, the IMU may comprise at least one of the following: a multi-axial accelerometer, a magnetometer, an altimeter, a barometer. It is preferable that the IMU comprises a magnetometer as the magnetometer provides an absolute reference for the IMU. A barometer, which is usable as an altimeter, may provide additional degrees of freedom to the IMU.

Sensors, such as the inertial measurement unit, IMU, sensor, may be configured to provide a sensor data stream. The providing may be within the apparatus, for example to a controller, a digital signal processor, DSP, a memory. Alternatively or additionally, the providing may be to an external apparatus. A sensor data stream may comprise one or more raw signals measured by sensors. Additionally, a sensor data stream may comprise at least one of: synchronization data, configuration data, and/or identification data. Such data may be used by the controller to compare, or combine, data from different sensors, for example.

In embodiments, the IMU as well as other sensors may provide data representing the orientation, position and/or movement of a user's body to the system and/or the wearable apparatus. The system and/or the wearable apparatus may compute at least one directive ray based on said data. For example, the system may comprise: a head apparatus such as a HMD and/or a wrist-wearable device, for example a smartwatch.

An apparatus, such as a wrist-wearable apparatus or a head apparatus, may comprise a controller 103, 163 within housing 102, 162. Controller 103, 163 comprises at least one processor and at least one memory and communications interface, wherein the memory may comprise instructions that, when executed by the processor, allow communication with other apparatuses such as a computing device via the communications interface. Controller 103, 163 may be configured to communicate with a head sensor and a wrist-wearable IMU, such as a head sensor 60 and wrist-wearable IMU 104, so as to at least receive data streams from the head sensor and the wrist-wearable IMU. In other words, the controller 103, 163 may be configured so as to cause the controller to receive at least one sensor data stream from at least one sensor. The controller may be configured to perform preprocessing on at least one of the sensor data streams, wherein the preprocessing may comprise the preprocessing disclosed herein. The controller may be configured to process the received at least one sensor data stream from the at least one sensor. The controller 103, 163 may be configured to generate, based on the characteristics of the processed sensor data stream, at least one user interface UI event and/or command. Further, the controller 103, 163 may comprise models, which may comprise at least one neural network. In some embodiments, the head apparatus controller 163 may be located in the, or mounted to, a head apparatus. In some other embodiments, the wrist-wearable apparatus controller 103 may be located in the, or mounted to, a wrist-wearable apparatus.

Apparatuses within this disclosure, for example wrist-wearable apparatus 170, may be configured to communicate with at least one head apparatus 160 comprising a head sensor 60,61,164. A head apparatus is to be understood as a device wearable on, or mountable to, a user's head. Such a head apparatus may comprise, for example, glasses, goggles, a helmet, a cap, a hat, a head band, or similar head gear. A head apparatus 160 may comprise at least one of a head mounted device HMD, headset, head mounted display, virtual reality VR headset, mixed reality MR headset, extended reality XR headset, or augmented reality AR headset, for example. A head apparatus may comprise a processor, memory and communications interface, wherein the memory may comprise instructions that, when executed by the processor, allow communication with other apparatuses such as a computing device via the communications interface and/or communication with other apparatuses within the same system comprising the said head apparatus.

For directive ray computation, directive ray 21, 27 orientation, especially the sensor drift is corrected and/or compensated with head sensor data. Such head sensor data may include data, for example, from a head mounted device HMD, head set, virtual reality VR headset, extended reality XR headset, augmented reality AR headset, or a video camera from which data representing, for example, gaze of the user, eye tracking, field-of-view, head position, and/or head orientation may be obtained.

A head sensor is configured to measure the position, orientation and/or movement of the user's head. Head sensor 60 may be housed inside, or positioned on, a head apparatus 160, such as a head mounted device. The head sensor 60 may comprise an inertial measurement unit, IMU, 164 and/or the head sensor may comprise a camera-based detection of orientation of the user's head, such as gaze tracking. The IMU-based head sensor 164 may be configured to provide orientation information of the user's head, as the IMU-based head sensor 164 may be attached or mounted to the head apparatus and consequently the user's head. The IMU-based head sensor 164 may preferably comprise a gyroscope. Further, the IMU-based head sensor may comprise at least one of the following: a multi-axial accelerometer, a magnetometer, an altimeter, a barometer. Head sensor 60, for example in the form of an IMU and/or a camera system, may be configured to provide a sensor data stream to a controller 103. An apparatus, such as a head apparatus 160 and/or wrist-wearable apparatus 170, may comprise such a controller. The head sensor 60 data may provide data with zero or near-zero drift, which is used to correct the drift of the wrist-wearable IMU 104 data. The wrist-wearable IMU 104 may be connected to, or configured to communicate with, at least one controller. A head sensor may be connected to, or configured to communicate with, at least one controller.

The camera-based head sensor 60 may comprise camera-based detection of orientation of the user's head. In some embodiments, the head sensor 60 data may comprise camera data, or data received from a plurality of cameras. Camera data may be used to compute the position and/or orientation of the head of the user. For example, a plurality of cameras, positioned to an external environment with respect to the user and/or head apparatus, may be used to track the head apparatus position. Alternatively or additionally, a the head apparatus may comprise a plurality of cameras configured to track and/or image the environment to obtain the user's head position and/or orientation with respect to the surroundings of the head apparatus and/or the user.

FIG. 1A illustrates a system 100 comprising a wrist-wearable apparatus 170 and a head sensor 60. System 100 is capable of computing and/or displaying an isomorphic directive ray 21. The wrist-wearable apparatus 170 comprises a wrist-wearable IMU 104. In isomorphic ray casting, a shift in the position of the user's hand and consequently wrist-wearable IMU 104, provides a linearly proportional change in the directive ray 21. Additional devices, such as a display unit, may be used to display the directive ray 21.

A "selection plane" is to be understood as a plane, for example a two-dimensional plane, in a three-dimensional space wherein an interactable, or other user interface UI element may reside, and wherein the directive ray 21, 27 ends, in other words, wherein the end-point of a directive ray 21, 27 is situated. It is noted that said selection plane may be, for example a curved plane. Alternatively, said directive ray may extend beyond the interactable, in other words, the directive ray 21, 27 and interactable intersect at the selection plane. The selection plane may comprise different locations and orientations depending on the directive ray location and/or orientation.

As illustrated in FIG. 1A, the movement of the hand, and consequent hand trajectory 34, produces a linear movement 35 of the end-point of an isomorphic directive ray 21 at the selection plane 30. In other words, the movement of the end-point of the isomorphic directive ray 21 at the selection plane 30 is directly proportional to the movement of the user's hand whereon a wrist-wearable apparatus 170, and wrist-wearable IMU therein, is positioned. Thus, the trajectory 34 of the wrist-wearable IMU, and consecutively the user's hand, is proportionally reflected in the selection plane. The end-point position of said isomorphic directive ray 21 on the selection plane 30 is shifted from a previous directive ray end-point 31 to an end-point, in FIG. 1A at isomorphic end-point 32, and is linearly dependent on the hand trajectory 34. As such in isomorphic ray casting, isomorphic cursor point 32 is the end-point of the directive ray 21. It is noted that the desired cursor point, represented in FIG. 1A as an anisomorphic cursor point 33, may be missed by the cursor due to the isomorphic behavior of the isomorphic directive ray 21.

Figure 1B:
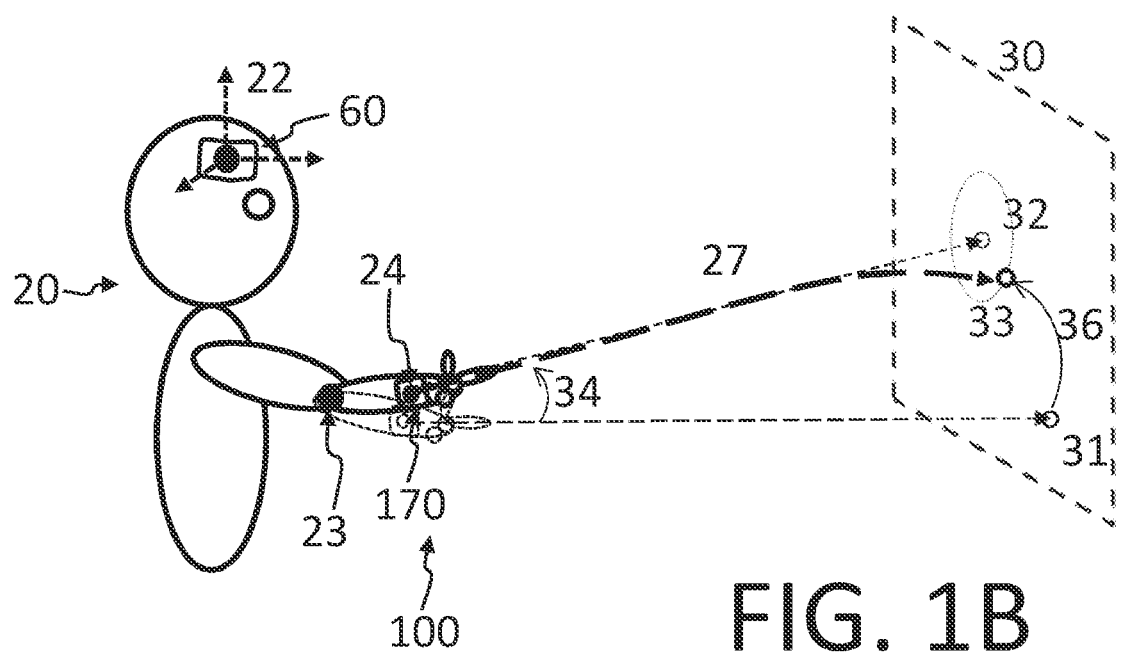
FIG. 1B illustrates a schematic view of an anisomorphic directive ray displayed to a user as supported by at least some of the embodiments of the present invention.

FIG. 1B illustrates system 100 capable of computing and/or displaying an anisomorphic directive ray 27. In other words, a shift in the position of the user's hand, and wrist-wearable apparatus 170 thereon may provide a non-linearly proportional change in the anisomorphic directive ray 27, depending on, for example, contextual logic. Additional devices, such as a display unit, may be used to display the anisomorphic directive ray 27.

In FIG. 1B, the movement 36 of the end-point of the anisomorphic directive ray 27 may be non-linearly proportional to the movement of the wrist-wearable IMU 104, and therefore the hand trajectory 34 measured at least in part with the wrist-wearable IMU 104. The end-point position of said anisomorphic directive ray 27 on a selection plane 30 is shifted from a previous directive ray end-point 31 to an end-point, in FIG. 1B at the anisomorphic cursor point 33, and is non-linearly dependent on the hand trajectory 34.

In the illustrated example in FIG. 1B, a desired cursor point, for example, an interactable such as a UI slider, a UI switch or a UI button in the user interface or other contextual information in the user-interface, affects the movement speed and/or positioning of the end-point of the anisomorphic directive ray 27, such change in movement of the directive ray 27 is depicted as a curved line, a curved directive ray. If an isomorphic directive ray were to be used, as is the case in FIG. 1A, the isomorphic cursor point 32 would be the end-point of such isomorphic directive ray, and as such the interactable at the desired cursor point, in FIG.

1B at the anisomorphic cursor point 33, would not be taken into account when computing the directive ray and consequently the cursor point. In embodiments, wherein anisomorphic directive ray 27 is used, such a directive ray may be visualized as a bended curve, in other words a non-straight track, at least between the interactive element and the wrist-wearable IMU 104. The interactive element may be an interactable. Such a visualization may be obtained using, for example, a head mounted display.

Figure 2A:
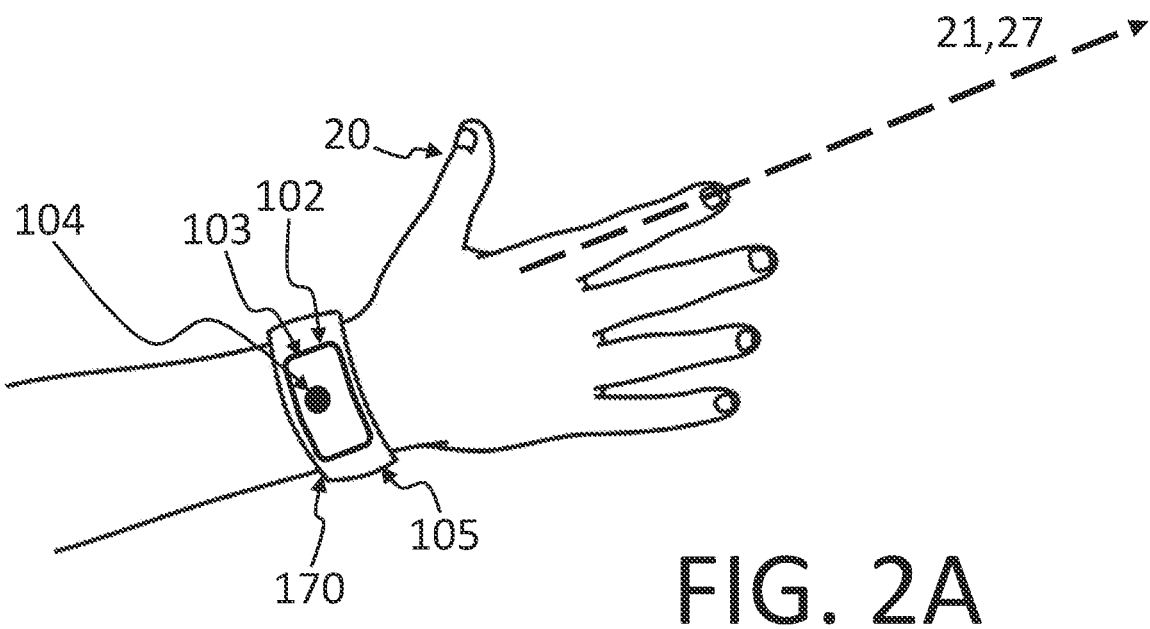
FIGS. 2A and 2B illustrate schematic views of an example system capable of supporting at least some of the embodiments of the present invention.
Figure 2B:
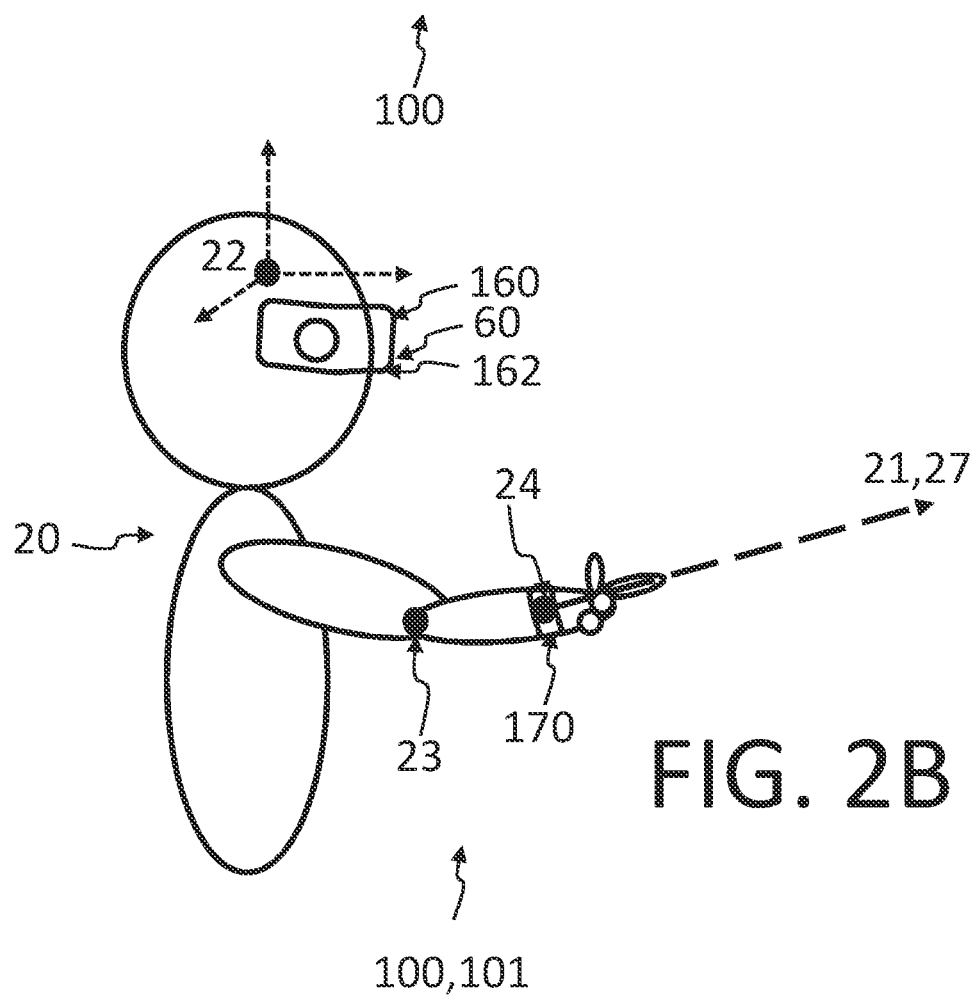

FIGS. 2A and 2B show system 100 and systems 100, 101, respectively, in accordance with at least some embodiments of the present invention. The wrist-wearable apparatus 170 comprises mounting component 105, which in the FIG. 2A is presented in the form of a strap. The wrist-wearable apparatus 170 comprises housing 102 attached to mounting component 105. The wrist-wearable apparatus 170 comprises controller 103 and IMU 104 within housing 102. The controller 103 comprises a processor, memory and communications interface. User 20 may wear the wrist-wearable apparatus 170, for example, on a wrist or other part of the arm of the user 20, such that that the wrist-wearable IMU 104 represents motion data of the user's hand.

In at least some embodiments the wrist-wearable inertial measurement unit, IMU, 104, or a sensor, such as a gyroscope, or a plurality of sensors housed in a single device or in a plurality of devices are placed and/or fastened on an arm of a user. Fastening may be done using, for example a mounting component 105. Arm is to be understood as the upper limb of a user's body comprising a hand, a forearm and an upper arm. Wrist connects the forearm and the hand. In the present disclosure, hand, arm, and forearm may be used interchangeably.

In at least some embodiments, the wrist-wearable apparatus 170 may comprise a smartwatch. In at least some embodiments, wrist-wearable apparatus 170 may comprise at least one of the following components, for example: a haptic device, a screen, a touchscreen, a speaker, a heart rate sensor (for example, an optical sensor), a Bluetooth communications device.

The wrist-wearable apparatus 170 may be configured to at least participate in providing data for, computing and/or displaying directive ray 21.

Referring to FIG. 2B, system 100,101 comprises a wrist-wearable apparatus 170 and a head apparatus 160. The system 100,101 may be suitable for sensing user motions and/or actions and acting as a user interface device and/or HMI device. The head apparatus comprises a head sensor 60 which may be a wrist-wearable IMU.

The system 100,101 and/or the wrist-wearable apparatus 170 comprises a wrist-wearable inertial measurement unit, IMU, 104. The wrist-wearable IMU 104 is configured to send a sensor data stream, for example to a controller 103. Said sensor data stream comprises, for example, at least one of the following: multi-axial accelerometer data, gyroscope data, and/or magnetometer data. One or more of the components of the wrist-wearable apparatus 170 may be combined, for example the wrist-wearable IMU 104 and the controller 103 may be located on the same PCB (printed circuit board). Changes in the wrist-wearable IMU 104 data reflect, for example, movements and/or actions by the user, and thus such movements and/or actions may be detected by using the wrist-wearable IMU 104 data. The wrist-wearable IMU 104 may be directly or indirectly connected to the processor and/or memory of controller 103 so as to provide sensor data to the controller.

In some embodiments, the system is further configured to reduce disturbance caused by measurement errors of a user's pointing posture by implementing a filter to improve the accuracy of the directive ray 21,27.

A trajectory of a hand is to be understood as the spatiotemporal path of a part of the arm. The trajectory of a hand may be measured and/or computed by a suitable apparatus, for example a wrist-wearable apparatus comprising a wrist-wearable IMU. Said apparatus may then be used to compute the directive ray 21, 27. The arm further comprises an elbow, connecting the upper arm and the forearm. In some embodiments, a computed estimate of elbow position, or so-called elbow point 23, may be used to assist in the formation and/or accuracy of the directive ray 21, 27. The directive ray 21, 27 may be aligned with the elbow point 23 and the location of the wrist-wearable IMU 104. For example, a wrist-wearable apparatus, comprising a wrist-wearable IMU with six degrees of freedom 6-DOF and a barometer may be used in to assist in prediction of elbow height of the interacting hand and using the predicted elbow height as an anchor point for the directive ray 21, 27. Alternatively or additionally, horizontal position of the elbow point may be estimated, for example, using at least in part the head sensor data. In some embodiments, the elbow location of the arm may be estimated. Further the directive ray may be aligned with the estimated elbow location and the location of the wrist-wearable IMU 104. Such an alignment may comprise adjustment of directive ray 21,27 so that the starting point is roughly the elbow of the user and where the ray intersects the IMU 104 location on the user's wrist before continuing.

The directive ray 21, 27 may be visualized in a point-and-select user-interface in a head apparatus 160 comprising a display unit and/or in a display unit separate from the head apparatus, for example an external screen, a computer monitor, or a display. The head apparatus 160 may be configured to communicate, transmit/receive data streams with a system 100, or a system, for example system 100 or system 101, may comprise head apparatus 160. In some embodiments, the directive ray 21, 27 may be visualized on a display, such as a display in a head mounted device, or an external display such as a computer monitor. In embodiments wherein the directive ray 21, 27 is displayed to the user, the directive ray 21, 27 may be visualized as a curve instead of a straight line extending from the hand of the user to a selection plane in a three-dimensional space. In other words, in cases wherein the wrist-wearable IMU 104 position and a cursor point on a selection plane do not align on the same straight path produced from the estimate of the hand trajectory, the directive ray 21, 27 may be displayed as a bent curve.

In some embodiments, the directive ray 21, 27 is computed on a wrist-wearable apparatus, for example wrist-wearable apparatus 170, comprising a controller, upon receiving a wrist-wearable IMU 104 data stream and a head sensor 60 data stream. However, in other embodiments, the directive ray 21, 27 is computed by a head apparatus 160 comprising a controller, wherein the head apparatus is configured to receive data streams from a head sensor and wrist-wearable IMU. The computation of components of said directive ray 21, 27 may be executed on separate devices, for example, one component of the directive ray may be computed on a wrist-wearable apparatus 170 and another component may be computed on a head apparatus 160, such as head mounted device HMD. Such components may be, for example, a pitch component and a yaw component of a directive ray.

Figure 3A:
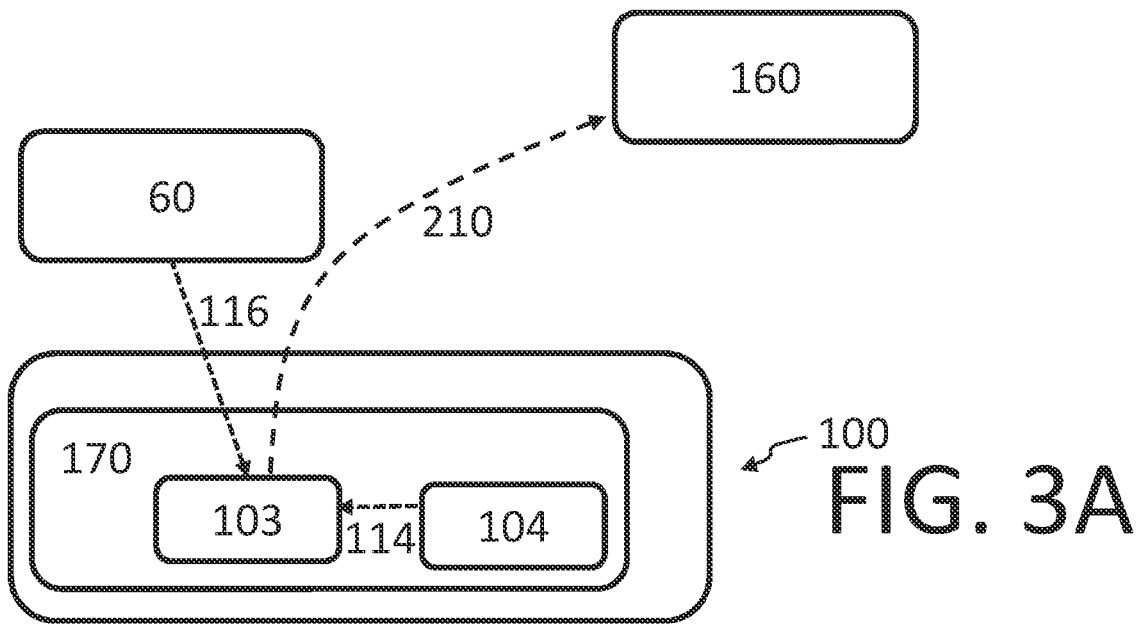
FIGS. 3A-3C illustrate schematic views of exemplary apparatuses capable of supporting at least some of the embodiments of the present invention.

FIG. 3A illustrates an example system 100 comprising the wrist-wearable apparatus 170. Apparatus 170 comprises a controller 103 and a wrist-wearable IMU 104. Further, the memory may comprise instructions that, when executed by the processor, allow the wrist-wearable apparatus 170 to compute a directive ray 21 based on data stream 116 from a head sensor 60 and data stream 114 from a wrist-wearable IMU 104. The wrist-wearable apparatus 170 is configured to receive head sensor data stream 116 from a head sensor 60 in controller 103. Controller 103 is configured to receive a wrist-wearable IMU data stream 114 from IMU 104. A directive ray may be computed from at least the wrist-wearable IMU data stream and head sensor data stream. Controller 103 may be configured to compute the directive ray 21, 27. Then, the computed directive ray 21, 27 may be transmitted as a directive ray data stream 114 to a head apparatus 160, comprising, for example, a display unit wherein the directive ray 21, 27 may be visualized. The head sensor 60 and the head apparatus 160 may be comprised in a single housing and/or apparatus.

Figure 3B:
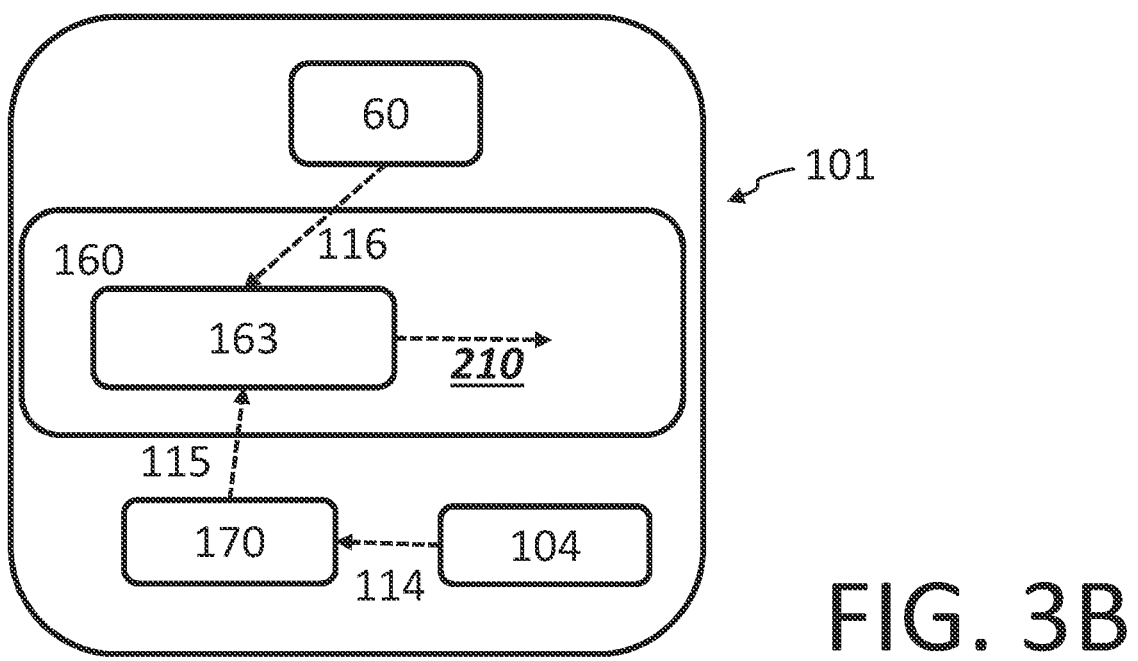

FIG. 3B illustrates an example system 101 comprising a head apparatus 160, wherein said head apparatus comprises a controller 163 comprising a processor, memory and communications interface. The memory may comprise instructions that, when executed by the processor, allow the head apparatus 160 and/or controller 163 to compute a directive ray 21, 27 based on a data stream 116 from a head sensor 60 and a data stream 115 from a wrist-wearable apparatus 170. The data stream 115 from the wrist-wearable apparatus 170 may be obtained at least in part from wrist-wearable IMU 104 as a data stream 114. The head sensor 60 may be separate from the head apparatus 160, or head apparatus 160 may comprise a head sensor such as IMU 164, for example.

Controller 163 may be configured to compute the directive ray 21, 27. At least part of the information related to the computed directive ray 21, 27 may be provided to the user via a head mounted display. Such provision may comprise displaying, visualizing or presenting said directive ray 21, 27 in an extended reality XR environment, such as augmented reality AR, mixed reality, or virtual reality VR. The controller 163 may be configured to provide the directive ray 21, 27 as a data stream 210.

Figure 3C:
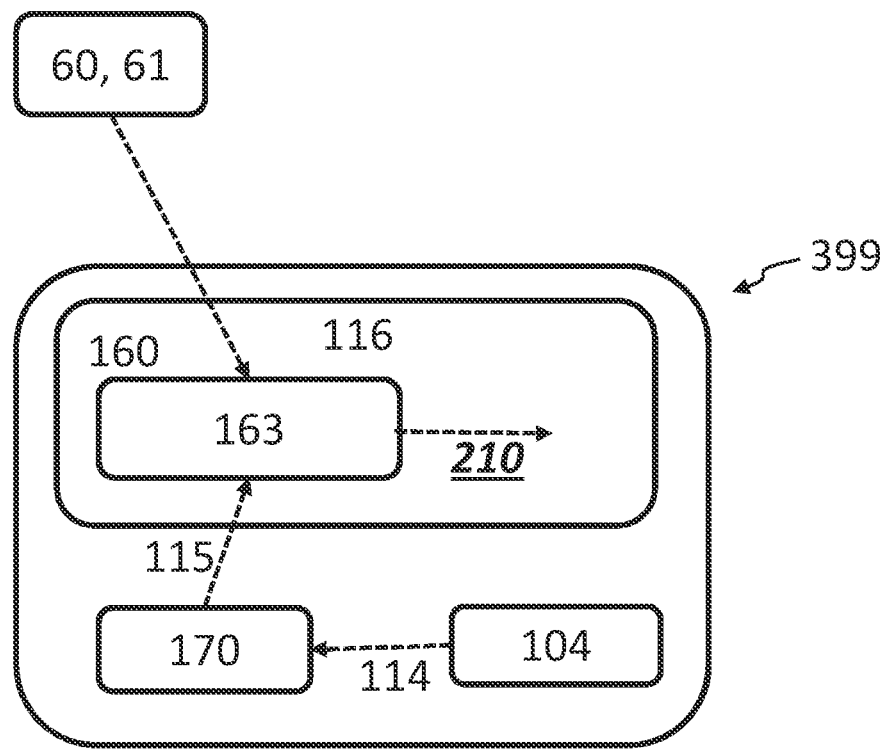

FIG. 3C illustrates an example system 399 comprising a wrist-wearable apparatus and head apparatus 160, wherein said head apparatus comprises a controller 163 comprising a processor, memory and communications interface. At least part of the information related to the computed directive ray 21, 27 may be provided to the user via a head mounted display. The controller 163 may be configured to provide the directive ray 21, 27 as a data stream 210. For system 399, the head sensor 60 may comprise or be a head sensor 61 capable of detecting gaze of the user. The head sensor 61 may comprise eye-tracking capabilities, such as a camera configured to capture eye movement. In an embodiment, the eye-tracking may be extended to gaze tracking, wherein information related to the location of the user's gaze in a three-dimensional environment is obtained. In an embodiment, the gaze of the user may be used to correct, or assist in the correction of, drift in an IMU-based hand orientation estimate, and therefore yaw component estimation of the directive ray 21, 27. In an embodiment, the gaze tracking is used to obtain information on the contextual logic related to the direction and/or orientation of the directive ray 21, 27. In other words, the gaze tracking provides information on where the user is looking, which may be used to estimate and/or correct the direction and/or orientation of the directive ray 21, 27. Similarly, the orientation of the directive ray 21, 27 may be corrected using eye-tracking information, for example by orienting the directive ray towards the point the user is looking at.

In an embodiment, a system, such as a system 399, may be further configured to align the directive ray 21,27 to an origin point, wherein the coordinates of the origin point are determined by the orientation of the user's head or gaze (POV center), for example where the origin point equals the center of the user's field of view. Such an alignment may comprise adjustment of directive ray 21,27 orientation and/or position, for example orienting the directive ray towards the origin point. Moreover, the extent, in other words the length, of the directive ray 21,27 may be adjusted based on the origin point.

The systems within this disclosure, for example system 100, system 101 or system 399, as well as apparatuses comprised therein such as a head apparatus 160 and/or wrist-wearable apparatus 170, may be configured to change the mode of operation between, for example, FIGS. 3A, 3B and 3C, based on a received instruction to change the mode. In other words, the systems may initially provide data stream 115 to a head device, and then later, in the same or the different application, change to a mode of operation where the ray is calculated onboard the wrist-wearable apparatus. Such a configuration provides flexibility as the user may use the wrist-wearable apparatus with several different systems. Systems may be configured to communicate with at least one computing device, where the communication may comprise providing and/or receiving a data stream. A computing device may comprise at least one of a computer, a server, a mobile device such a smartphone or tablet. Said device may be configured to at least participate, for example by computation, in providing a VR/XR/AR/MR experience to a user. A computing device may comprise a processor, memory and communications interface, wherein the memory may comprise instructions that, when executed by the processor, allow communication with other apparatuses such as wrist-wearable apparatus 170 or a head apparatus 160 via the communications interface. Alternatively, the head apparatus may comprise said computing device.

The computed directive ray 21 is dependent at least on the user arm position, movement and changes therein, which may be measured by apparatus 170, for example. Euler angles may be used to represent the orientation of a directive ray 21, 27 comprising a yaw ψ, pitch θ and roll φ components, alternatively termed heading, elevation and bank. In some embodiments, the roll component may be omitted, or its contribution reduced, as its effect on the general direction of the directive ray 21, 27 may be minimal.

Using wrist-wearable IMU 104 data stream and a head sensor 60 data stream, and gravity information, such as a computed gravity vector, a directive ray 21, 27 may be obtained by computing yaw and pitch components of the directive ray 21, 27. The directive ray 21 may be represented as a vector v, as a combination of the yaw component y and the pitch component θ according to the equation EQ.1 below.

$$v = \begin{bmatrix} \sin(\psi) \cdot \sin(\theta) \\ \sin(\theta) \\ -\cos(\psi) \cdot \cos(\theta) \end{bmatrix} \quad (\text{EQ. 1})$$

According to the equation EQ.1 above, the forward direction of the directive ray 21, 27 may be defined as v=(0,0,−1).

From the wrist-wearable inertial measurement unit, IMU 104, located on the hand of the user, sensor data stream is obtained by a system or an apparatus for computing a directive ray 21, 27, in other words, for ray casting. The wrist-wearable IMU 104 data stream may comprise: gyroscope data and/or gravity information.

Gravity information describes the information on orientation of a sensor or a plurality sensors with respect to gravity. For example, gravity information may be obtained from an inertial measurement unit, IMU.

Gravity information may comprise a gravity vector. The term "gravity vector" refers to a three-dimensional vector depicting the direction and magnitude of gravity with respect to orientation of a sensor from which data used for computation is obtained. Gravity vector $\hat{g}$ may be computed from at least accelerometer data and gyroscope data from the wrist-wearable IMU 104. Further, in some embodiments, the gravity vector may be computed from a combination of data streams obtained from a plurality of sensors and/or sensor types. Alternatively, a pre-computed gravity vector data stream may be obtained, for example, from a wrist-wearable IMU 104 or a wrist-wearable apparatus configured to produce a computed gravity vector data stream. Such a pre-computed gravity vector and corresponding data stream may be considered as obtained from a "software sensor" wherein plurality of sensor signals are processed and computed in order to obtain said gravity vector.

Gravity information may comprise accelerometer and gyroscope data streams received from the wrist-wearable IMU 104, where a Madgwick filter may be applied to at least one of the data streams. Such a Madgwick filter provides orientation information of the wrist-wearable IMU 104, which may be used in the computation of pitch and yaw components of the directive ray 21, 27, similarly to the computation of said components using a gravity vector.

The obtained gravity vector may be normalized with respect to the norm or length of the gravity vector thus, providing a normalized gravity vector. The normalized gravity vector $\hat{g}_n$ may be defined using the obtained gravity vector $\hat{g}$ according to the equation EQ.2 below.

$$\hat{g}_n = \begin{bmatrix} \hat{g}_{nx} \\ \hat{g}_{ny} \\ \hat{g}_{nz} \end{bmatrix} = \frac{\hat{g}}{|\hat{g}|} \quad \text{(EQ. 2)}$$

The yaw component w/of the directive ray 21 may be computed from the computed normalized gravity vector and at least one sensor data stream, for example, yaw component of gyroscope data obtained from the IMU, 104 wearable on the hand of the user.

Further, head sensor data is used to account for the wrist-wearable IMU 104 sensor drift in the yaw component. Head sensor data may be received from a head apparatus as discussed earlier, for example a head apparatus configured to obtain information on head orientation and display a VR, MR, AR or XR application to a user. The obtained information may be preprocessed by a head apparatus comprising the head sensor to obtain orientation of the head apparatus, and thus, the head orientation of the user. Alternatively, the head sensor data stream may be transmitted to, for example a controller comprised in a wrist-wearable apparatus, or the head sensor data may be preprocessed and/or processed on a head apparatus. Raw data streams from a head sensor 60 and wrist-wearable IMU 104 may be processed by head apparatus 160, for example. Head sensor 60 data is beneficial in providing information on the orientation of the user and/or head orientation of said user, as well as possible intention with respect to the direction of, and user action related to, the directive ray 21.

Head sensor 60 data may provide information on where the user's gaze is, which may assist in the assessment of the direction and orientation of the directive ray 21, 27. Head sensor data may be provided as a data stream comprising information on, or related to, head orientation.

An example process 903B, performed by a system, such as any of systems 100, 101 and 399, for obtaining the yaw component y of the directive ray 21, 27 is as follows: A vertical direction vector $\hat{g}_\phi$, derived from the normalized gravity vector, describes the direction of down with respect to the sensor device coordinates, perpendicular to the arm or hand of the user whereon said sensor is positioned. In other words $\hat{g}_\phi$ represents the roll component of the gravity vector, and thus, further represents a projection of the normalized gravity vector $\hat{g}_n$ on a plane perpendicular to the arm. The vertical direction vector $\hat{g}_\phi$ may then be described as in the equation EQ.3 below.

$$\hat{g}_\phi = \begin{bmatrix} 0 & 0 & 0 \\ 0 & 1 & 0 \\ 0 & 0 & 1 \end{bmatrix} \cdot \hat{g}_n = \begin{bmatrix} 0 \\ g_{ny} \\ g_{nz} \end{bmatrix} \quad \text{(EQ. 3)}$$

The yaw component of the angular velocity $\hat{\omega}_\psi$ describes the yaw in world orientation, whereas $\hat{g}_\phi$ describes the sensor orientation. The yaw component of angular velocity $\hat{\omega}\psi$ may be computed from a dot product of the gyroscope data $\hat{\omega}$ and the vertical direction vector $\hat{g}_\phi$.

$$\hat{\omega}_\psi = \hat{g}_\phi \cdot \hat{\omega} \quad \text{(EQ. 4)}$$

Then, the yaw component da of the directive ray 21, 27 may be obtained according to equation EQ.5 below as a time-wise integral of the yaw component of the angular velocity.

$$\psi_{\hat{\omega}} = \int \hat{\omega}_\psi dt \quad \text{(EQ. 5)}$$

Because of sensor drift, a scalar c may be used to center the directive ray towards a yaw obtained from a head sensor, for example, comprised in a head apparatus, such as a head mounted device HMD. This yaw is termed as the headset yaw, $\psi_h$. Then, as presented in the equation EQ. 6 below, integration with respect to time t of the product between the scalar c and yaw component of the angular velocity provides a corrected yaw component of the gyroscope data.

$$\psi_{\hat{\omega}} = \int c \cdot \hat{\omega} dt \quad \text{(EQ. 6)}$$

The yaw angle $\psi_{\hat{\omega}}$ of the gyroscope is aligned with respect to the headset yaw $\psi_h$. The difference between the two yaw components, in other words the yaw component of the gyroscope and the yaw component of the headset, may be used to compute scalar c. The sign of the difference may be flipped to represent the direction of the directive ray as depicted in equation EQ. 7 below.

$$\Delta\psi = (\psi_{\hat{\omega}} - \psi_h) \cdot \text{sign}(\hat{\omega}_\psi) \quad \text{(EQ. 7)}$$

Using the difference $\Delta\psi$ between the yaw component of the gyroscope and the yaw component of the headset, a value for the scalar c may be obtained. An example of values for the scalar c are presented in the equation EQ. 8 below.

$$c = \begin{cases} 0.95 & \text{if } \Delta\psi \geq \dfrac{\pi}{2} \\ 1.0 & \text{if } \Delta\psi \leq 0 \\ \text{linear} & \text{otherwise} \end{cases} \qquad \text{(EQ. 8)}$$

In other words, c may be dependent on the difference of the yaw component of the gyroscope $\psi_{\hat{\omega}}$ and the yaw component of the headset $\psi_h$. Thus, the yaw component y of the directive ray 21, 27 may be obtained using scalar c.

An advantage of using the head sensor, and yaw component of said head sensor, is the ability to correct and/or compensate for sensor drift observable especially in the yaw component obtained from the wrist-wearable IMU. In other words, as the yaw component of the head sensor experiences minimal or non-existent drift, the head sensor data may be used to correct sensor drift, for example, as described in equation EQ. 7 and EQ. 8 above. The head sensor data, and the computed yaw component thereof, is obtained relative to the yaw component from wrist-wearable IMU 104, in other words, in a comparable coordinate system.

The pitch component θ of the directive ray 21 may be computed at least in part from the normalized gravity vector and at least one sensor data stream, for example, gyroscope data obtained from the IMU, 104. The at least one sensor stream data may be high-pass filtered and the gravity vector data may be low-pass filtered.

An example process 903A, performed by a system, such as any of systems 100, 101 and 399, to obtain the pitch component of the directive ray 21, 27 is presented below.

To obtain the pitch component of the directive ray 21, 27, a $\hat{g}_\phi$, vector may be computed. The $\hat{g}_\phi$, vector is perpendicular to the normalized gravity vector $\hat{g}_n$ and perpendicular to the arm. $\hat{g}_\phi$, may be obtained using equation EQ. 9 below.

$$\hat{g}_{\phi'} = \begin{bmatrix} 0 & 0 & 0 \\ 0 & 0 & 1 \\ 0 & -1 & 0 \end{bmatrix} \cdot \hat{g}_n = \begin{bmatrix} 0 \\ \hat{g}_{nz} \\ -\hat{g}_{ny} \end{bmatrix} \qquad \text{(EQ. 9)}$$

The pitch component of angular velocity $\hat{\omega}_\theta$ is obtained as a dot product between $\hat{g}_\phi$, vector and the angular velocity $\hat{\omega}$ of the obtained gyroscope data using equation EQ. 10 below.

$$\hat{\omega}_\theta = \hat{g}_\phi \cdot \hat{\omega} \qquad \text{(EQ. 10)}$$

From the angular velocity pitch component $\hat{\omega}_\theta$, a pitch angle component $\theta_{\hat{\omega}}$ of the gyroscope is obtained according to equation EQ. 11 below by integrating with respect to time t.

$$\theta_{\hat{\omega}} = \int \hat{\omega}_\theta dt \qquad \text{(EQ. 11)}$$

Because of, for example, sensor drift, the pitch angle may be corrected using the normalized gravity vector. Next, the angle $\theta_{\hat{g}}$ of the normalized gravity vector $\hat{g}_n$ is obtained. For example, the angle $\theta_{\hat{g}}$ of the normalized gravity vector $\hat{g}_n$ may be computed using equation EQ. 12 below.

$$\theta_{\hat{g}} = \arcsin(\hat{g}_{nx}) \qquad \text{(EQ. 12)}$$

Alternative methods to compute the angle $\theta_{\hat{g}}$ exist as well. For example, as equation EQ. 12 may be inaccurate, especially when $\hat{g}_{nx}$ is close or equal to unity, other components of the gravity vector may be incorporated, an example of which presented in equation EQ. 13 below using a 2-argument arctangent.

$$\theta_{\hat{g}} = a\tan 2(\hat{g}_{nx}, \hat{g}_{ny}^2 + \hat{g}_{hz}^2) \qquad \text{(EQ. 13)}$$

By combining the gravity angle $\theta_{\hat{g}}$ and the pitch angle of the gyroscope $\theta_{\hat{\omega}}$, a representation of the vertical component, pitch θ of the directive ray 21, 27 may be obtained. Further, the gravity angle $\theta_{\hat{g}}$ and the pitch angle of the gyroscope $\theta_{\hat{\omega}}$ may be filtered. The accuracy of the directive ray 21, 27 may be improved by correcting for sensor inadequacies and reducing noise by using such filtering. At least in some embodiments, the angle of the gravity vector $\theta_{\hat{g}}$ is low-pass filtered L and the angle of the pitch component of the gyroscope vector $\theta_{\hat{\omega}}$ is high-pass filtered H, thus obtaining a pitch component θ of the directive ray 21, 27, as depicted in equation EQ. 14 below.

$$\theta = H(\theta_{\hat{\omega}}) + L(\theta_{\hat{g}}) \qquad \text{(EQ. 14)}$$

Furthermore, the filtering may be done such that yaw component of the gyroscope data, or the yaw component of the gravity vector data is emphasized in the yaw component of the directive ray 21, 27. Such low pass filtering and high pass filtering may be done, for example, using an infinite impulse response IIR filter according to equations EQ. 15 and EQ. 16 below, respectively.

$$\text{low}_t = \alpha \ast \text{in}_t + (1-a) \ast \text{low}_{t-1} \qquad \text{(EQ. 15)}$$

$$\text{high}_t = \text{in}_t - \text{low}_t \qquad \text{(EQ. 16)}$$

For example, the a value, in other words a decay parameter, of the low-pass filter in EQ. 15 above may be selected such that yaw component of the gyroscope data, or the yaw component of the gravity vector data is emphasized in the yaw component of the directive ray 21. Alternatively, the a value may be selected such that approximately half of the signal originates from the yaw component of the gyroscope data, and half of the signal originates from the yaw component of the gravity vector data. Alternatively or additionally, low pass filtering and high pass filtering may be done, for example, using Chebyshev, Butterworth and/or various other filter designs.

The cut-off frequencies for the low-pass filter and the high-pass filter may be the same or substantially the same. In other words, the bound of the low-pass filter frequency may be the same or substantially the same frequency as the bound of the high-pass frequency.

In some embodiments, the apparatus is configured to re-compute, based at least in part on the normalized gravity vector and based at least in part on the data obtained from the at least one IMU 104, a yaw component of the directive ray 21, 27 if the directive ray 21, 27 is substantially parallel or antiparallel with respect to the normalized gravity vector. In other words, the yaw component of the directive ray 21, 27 is reset, when the user is pointing his hand, wherein the wrist-wearable IMU 104 is mounted, down or substantially down. When said hand is lifted from the described down position, the directive ray is directed or points to the direction of the user's head, information which is obtained using a head sensor 60. In such situations, the yaw component obtained from the wrist-wearable IMU may be omitted until reliable information on the wrist-wearable IMU orientation is obtained with respect to the head sensor information. Similar reset of directive ray may be done when the hand of the user is pointing directly up or substantially up.

In some embodiments, the sensitivity of the gesture identification is adjusted with information based on an interactive element and/or trajectory of the directive ray 21, 27.

Figure 4A:
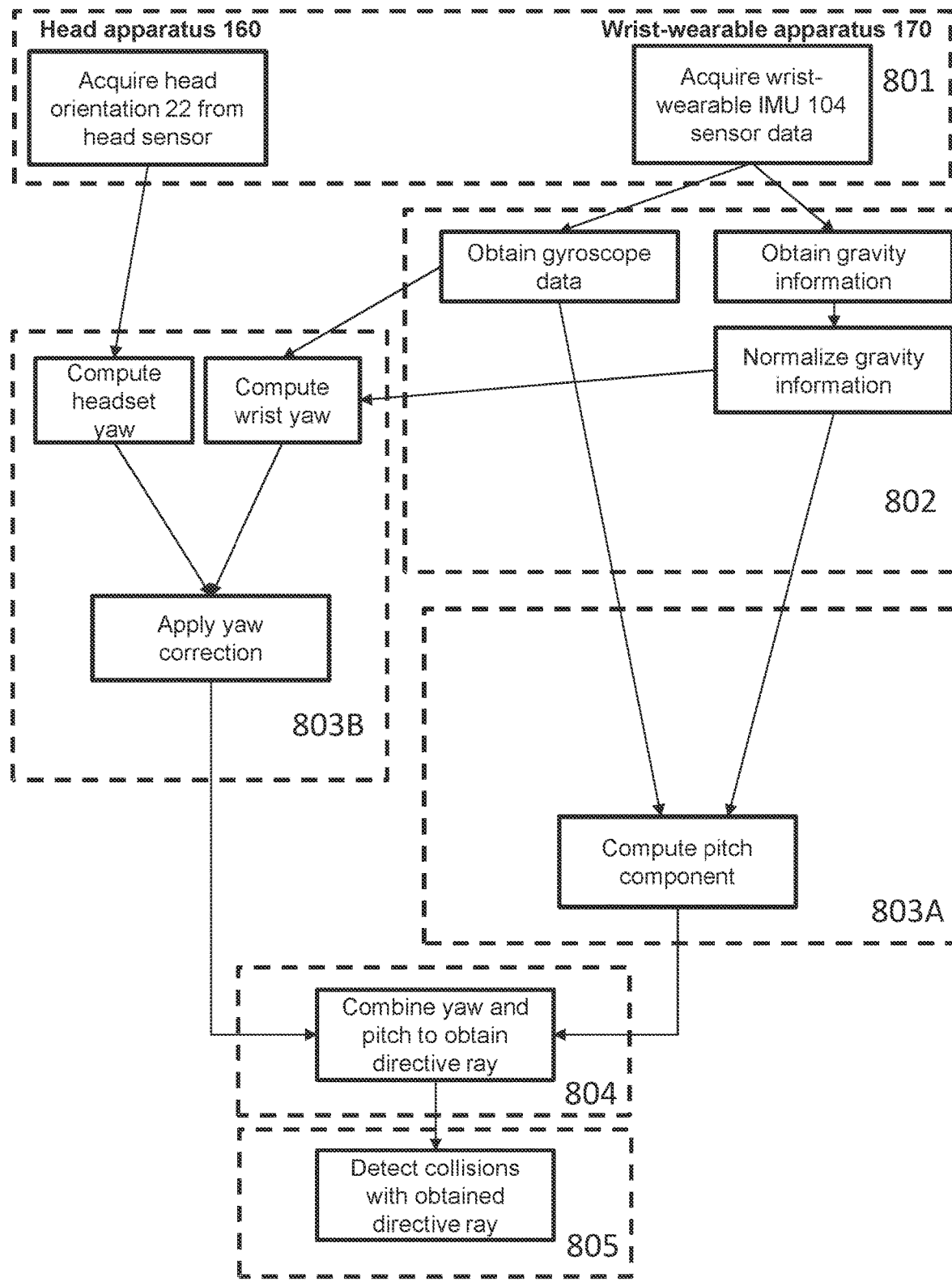
FIGS. 4A and 4B illustrate in flowchart form exemplary processes capable of supporting at least some embodiments of the present invention.

FIG. 4A illustrates in flowchart form an exemplary process capable of supporting at least some embodiments of the present invention. The flowchart of FIG. 4A comprises illustrative but non-limiting phases 801, 802, 803A, 803B, 804 and 805. Further, the actions within phases 801, 802, 803A, 803B, 804 and 805 need not be performed concurrently.

At the top of FIG. 4A in phase 801, data are acquired from at least one wrist-wearable IMU 104 and at least one head sensor 60. The actions and phases of the process illustrated by FIG. 4A may be performed in least in part by an apparatus, for example an apparatus disclosed herein such as a controller, for example controller 103. At least some actions, such as providing contextual information, may be performed by a second apparatus, such as a computing device or controllable system, for example. The at least one wrist-wearable IMU 104 data comprises gyroscope data. Such wrist-wearable IMU 104 data may be obtained, for example, as a part of a data stream. The at least one head sensor 60 data may be head orientation, for example.

In 802, data is obtained from at least one wrist-wearable IMU 104. The data comprise gyroscope data and gravity information. Gravity information may comprise information received from a hand-mounted IMU, for example accelerometer and/or gyroscope data. The gravity information may be normalized, for example, where said normalization may comprise scaling the information, for example. The said gravity information is then used in the computation of the pitch component of a directive ray in phase 803A.

In some embodiments, a pitch component may be directly obtained from gravity information, for example, as per equations EQ. 12 or EQ. 13 regarding computation of pitch from a normalized gravity vector and components therein. In other words, for example in phase 802, such embodiments the gyroscope data may be omitted from the pitch component computation in phase 803A.

For the computation of the yaw component, the head sensor data is utilized together with the yaw component, for example gyroscope data, of the wrist-wearable IMU to compute the yaw component of the directive ray 21, 27, in phase 803B. Head sensor data is used to correct for the drift in the yaw component computed from the wrist-wearable IMU 104.

For the computation of the pitch component in 903A, the computation may be done for example using a Madgwick filter tuned to take in "too much" gyroscope. In other words, the filter may be configured to bias angular velocity correctness over orientation correctness.

In phase 804, the computed yaw component and the computed pitch component are then combined to obtain the directive ray 21, 27, for example, equation EQ.1 as discussed above.

In phase 805, collisions with the obtained directive ray may be detected. Such collisions may provide contextual information used to compute a consecutive or subsequent directive ray and/or the position, location and/or orientation of said consecutive or subsequent directive ray. Furthermore, such collisions may be, or be part of, for example, intersections between the directive ray 21, 27 with respect to the surrounding environment, such as interactables, for example UI buttons, switches and sliders or, for example grabbable objects. Collisions with directive ray 21, 27 may be displayed and/or visualized in extended reality XR, such as virtual reality VR, augmented reality AR or mixed reality MR.

Figure 4B:
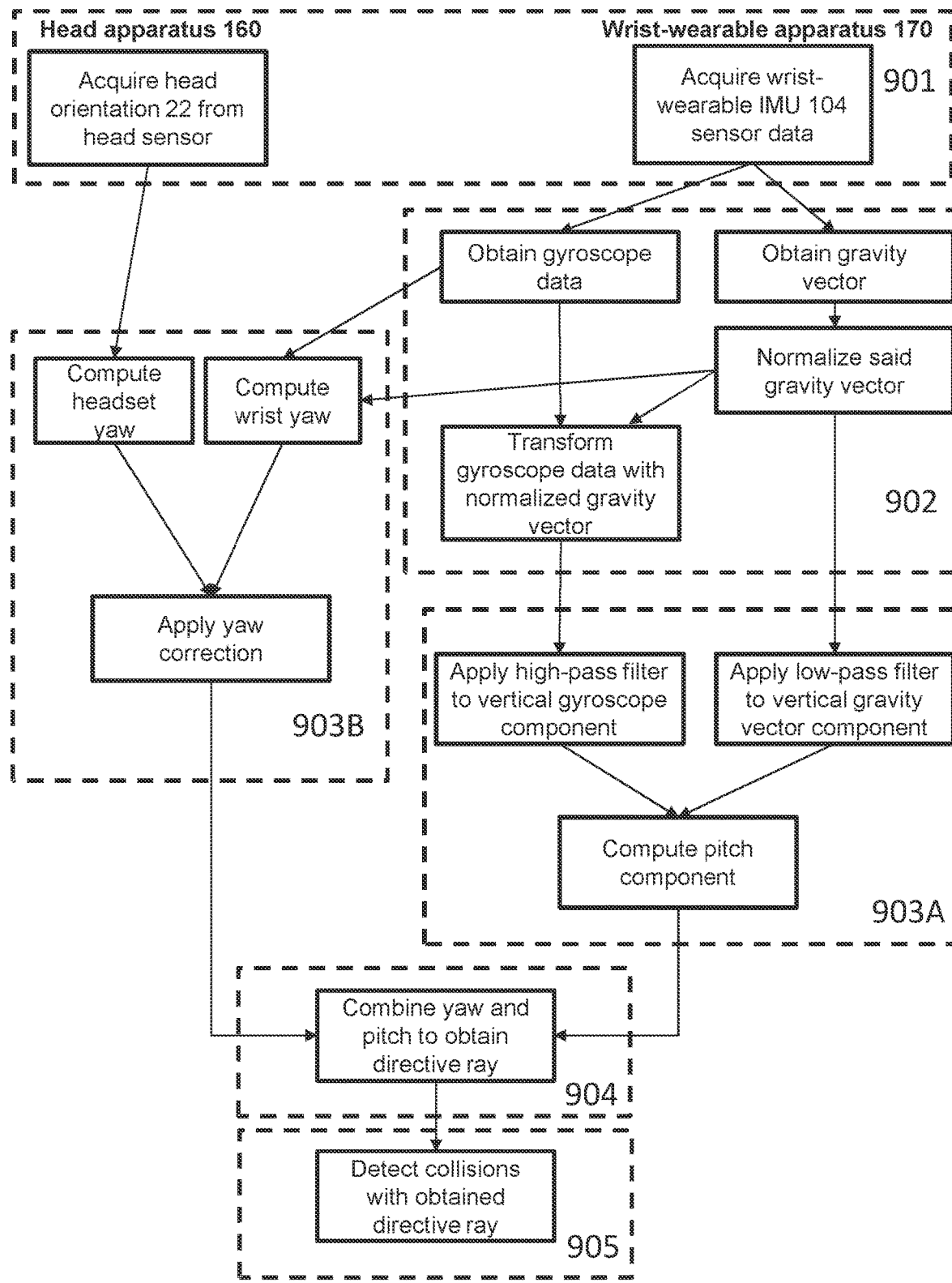

FIG. 4B illustrates in flowchart form exemplary process capable of supporting at least some embodiments of the present invention. The flowchart of FIG. 4B comprises illustrative but non-limiting phases 901, 902, 903A, 903B, 904 and 905. Further, the actions within phases 901, 902, 903A, 903B, 904 and 905 need not be performed concurrently.

The data obtained from at least one wrist-wearable IMU 104 may be used to compute a gravity vector. Said gravity vector is then normalized in phase 902. The said normalized gravity vector is then used in the computation the yaw component and pitch component of a directive ray.

For the pitch component of the directive ray 21, 27, low-pass filtering of the gravity vector data and high-pass filtering of the gyroscope data may be applied as illustrated in phase 903A. Filtering may be done, for example, using equations EQ.15 and EQ.16 as discussed above. The pitch component of the directive ray 21, 27 may then be computed by combining the low-pass filtered gravity data and high-pass filtered gyroscope data, for example, using EQ.14 as discussed above.

For the computation of the yaw component, the head sensor data is utilized together with the yaw component of the wrist-wearable IMU to compute the yaw component of the directive ray 21, 27, as in phase 903B. Head sensor data is used to correct for the drift in the yaw component computed from the wrist-wearable IMU 104.

In phase 904, the computed yaw component and the computed pitch component are then combined to obtain the directive ray 21, 27, for example, equation EQ.1 as discussed above.

In phase 905, collisions with the obtained directive ray may be detected. Such collisions may provide contextual information used to compute a consecutive or subsequent directive ray and/or the position, location and/or orientation of said consecutive or subsequent directive ray. Furthermore, such collisions may be, or be part of, for example, intersections between the directive ray 21, 27 with respect to the surrounding environment, such as interactables, for example UI buttons, switches and sliders or, for example grabbable objects. Collisions with directive ray 21, 27 may be displayed and/or visualized in extended reality XR, such as virtual reality VR, augmented reality AR or mixed reality MR.

Controller 103 may be configured to perform the above-mentioned phases, including phase 903A and 903B. Further, controller 103 may be configured to provide, via the communications interface, a computed directive ray 21, 27 to at least one of: a second apparatus, a head apparatus, a computing device. The directive ray may be provided as a data stream comprising, for example bit stream, or packets, and such directive ray data stream may be provided for a head apparatus, for example a head mounted device comprising a display.

Figure 5:
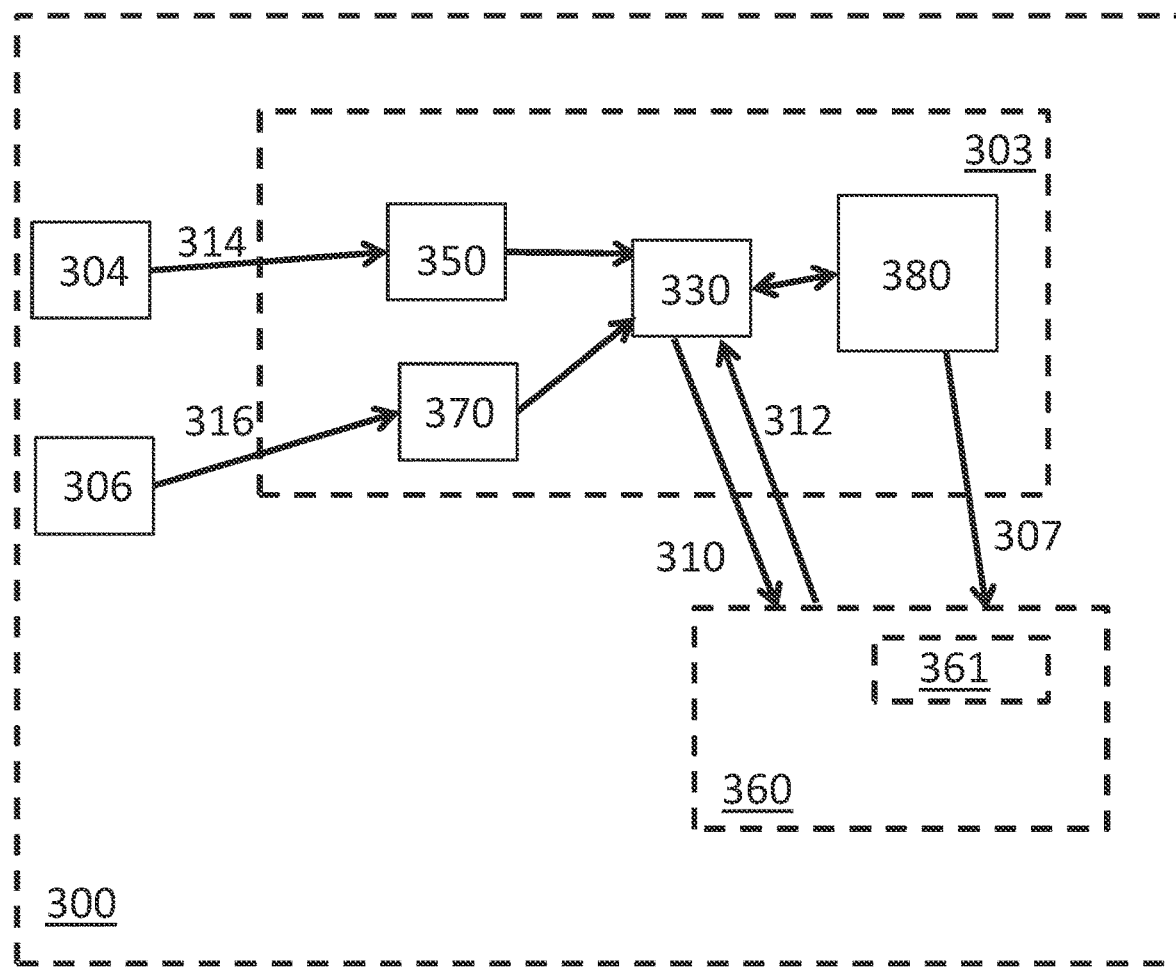
FIG. 5 illustrates a schematic view of a system capable of supporting at least some embodiments of the present invention.

FIG. 5 illustrates system 300 capable of supporting at least some embodiments of the present invention. Said systems are identical to system 100 except when stated otherwise.

In FIG. 5, an exemplary schematic view of system 300 is shown. As can be appreciated from FIG. 5, the system 300 comprises the wrist-wearable IMU 304, head sensor 306 and controller 303. Controller 303 is shown in the figure represented by the dotted line. As shown in the figure, controller 303 may comprise, for example in the memory of the controller, at least the preprocessing blocks 350 and 370 and model 330. Controller 303 may comprise event interpreter and/or classifier 380. System 300 may be configured so that the event interpretation and UI command generation is done within system 300.

Sensors 304 and 306 are each configured to transmit sensor data streams, for example, the sensor data streams 314 and 316, respectively. The sensor data streams may be received by the controller 303. The sensor data streams 314 & 316 may be preprocessed and based at least in part on the sensor data streams 314 & 316, a directive ray may be computed using a model 330. The computed directive ray is then provided and/or applied to scene information 361. Said computed directive ray may be provided as a data stream 310.

Contextual information 312, such as scene-based contextual information and/or gesture-related information, may be used to update the directive ray 310 to correspond to a probable a user action and/or user intent, such as location in a selection plane in a three-dimensional space, or intended pointing location and/or selection location obtained concurrently. Such information may be obtained from an event interpreter or a classifier 380 indirectly via scene 361 or directly. The contextual logic, and the scene information 361 may be provided from a scene within head apparatus 360, to the model 330 as a data stream 312.

Scene information 361, such as those disclosed regarding system 300, may comprise, for example, interactables such as user interface UI buttons, UI switches or UI sliders. Scene information may comprise one or more previous locations, orientations and/or positions of a directive ray, or it may be related to the point-of-view and/or gaze of the user. Within the controller and/or using the controller 303, the received and preprocessed sensor data streams are directed to at least one model, such as model 330.

A controller, such as controller 103 or controller 303, may comprise a neural network. The neural network may be, for example, a feed-forward neural network, a convolution neural network, or a recurrent neural network, or a graph neural network. A neural network may comprise a classifier and/or regression. The neural network may apply a supervised learning algorithm. In supervised learning, a sample of inputs with known outputs is used from which the network learns to generalize. Alternatively, the model may be constructed using an unsupervised learning or a reinforcement learning algorithm. In some embodiments, the neural network has been trained so that certain signal characteristics correspond to certain user action characteristics, such as a user hand trajectory.

A model may comprise at least one of: algorithms, heuristics, and/or mathematical models. For example, the model 330 may comprise an algorithm to compute orientation which, using wrist-wearable IMU data stream 314 with the head sensor data stream 316, is comprised in the directive ray computation. The wrist-wearable IMU may provide tri-axial accelerometer, gyroscope and magnetometer data. The directive ray may further be provided for a classifier, or event interpreter 380, wherein the directive ray may be classified based on the scene information 361. Such classifier 380 may be, for example a ballistic/corrective phase classifier.

A model, such as model 330, may be implemented to improve ray casting and directive ray 21 orientation and directive ray 21 direction by identifying or classifying a gesture of a user. At least one confidence value, preferably a series of confidence values, may be output by a model, an apparatus or a system, based at least in part on the identification and/or classification. At least one sensor data stream, such as an optical sensor data stream and/or a IMU data stream, may be directed into at least one model. Such a model may be a machine learning model, comprising, for example, at least one neural network, such as a feed-forward, convolutional, recurrent or graph neural network. The model may additionally or alternatively comprise at least one of a supervised, unsupervised or reinforcement learning algorithm. Feature extraction from input data may be done using a feature extraction module, which may comprise a neural network, for example a convolutional neural network. User actions, such as pinching in order to select an interactable element, may be identified using long short-term memory LSTM recurrent neural network RNN, for example. A system may further incorporate a feature extraction module configured to analyze the sensor data stream and identify additional user actions beyond selection gestures. Additional user actions may be, for example, gestures that are used for pointing, for example with different fingers, such as index finger pointing or middle finger pointing. Alternatively or additionally, additional user actions may comprise, a roll of the wrist or arm.

Sensitivity of a gesture recognition model using a neural network may be further adjusted based on a previous selection and/or pointing history of a user. Such user specific adjustment of the gesture recognition model may be done by, for example, adjusting some of the early and or late layers of the neural network. The previous selection history, comprising at least one selection performed by the user, of the user may be stored in an apparatus, such as a head apparatus or wrist-wearable apparatus or, for example, in a cloud-based storage system. Such a system may be configured to adjust the sensitivity of the machine learning model based on a previous history of the user, for example a selection history.

A model may comprise, for example, at least one convolutional neural network, CNN, performing inference on the input data, for example the signals received from the sensors and/or preprocessed data. Convolutions may be performed in spatial or temporal dimensions. Features (computed from the sensor data fed to the CNN) may be chosen algorithmically or manually. A model may comprise a further RNN (recurrent neural network), which may be used in conjunction with a neural network to support user action characteristic identification based on sensor data which reflects user activity.

In accordance with this disclosure, the training of a model may be performed, for example, using a labelled data set containing multimodal motion data from multiple subjects. This data set may be augmented and expanded using synthesized data. Depending on the employed model construction technique, the sequence of computational operations that compose the model may be derived via backpropagation, Markov-Decision processes, Monte Carlo methods, or other statistical methods. The model construction may involve dimensionality reduction and clustering techniques.

Further, contextual logic may be applied to improve the directive ray 21 orientation and direction. Such contextual logic may be based on received contextual information, such as contextual information 312. Contextual information may comprise location information, such as coordinates, of a user interactable element, such as a slider, a button and the like, implemented, for example, in augmented reality, AR, mixed reality, MR, extended reality XR or virtual reality, VR. Additionally or alternatively, contextual information may comprise the proximity of the ray end-point and at least one UI element, calculated by apparatus providing the scene. In other words, the computation of the directive ray 21 may be based at least in part on contextual information. For disambiguation of a contextual selection, a confidence value may be employed. Contextual information may thus, be incorporated to produce an adaptive threshold for an interactable element or other contextual information. Further, the sensitivity of gesture identification may be adjusted based on contextual information, where the adjusting may comprise adjusting a confidence value threshold. For example, if a UI element is near the ray end-point, the threshold for detecting a pinch may lowered from, for example, 90% to 50%.

Furthermore, scene information, for example, obtained from a head apparatus comprising a display unit, may be incorporated in gesture recognition and/or directive ray computation. In other words, contextual information may be incorporated with information on a confidence level of a determined gesture. If, for example, a confidence level for a gesture is deemed high enough to be recognized as a gesture, but no interactable element suitable for the gesture is present in the scene information wherein directive ray is located, such gesture may be on such occasion dismissed. Contextual information comprising gesture-related information may be incorporated into directive ray computation. If, for example, a gesture is present, or deemed to be a certain gesture with high probability, then the directive ray orientation, position and/or movement may be adjusted based on scene information. Such scene information may be a gesture-specific interactable, for example. A system may be configured to adjust detection thresholds of point interactions based on the directive ray 21,27 end-point, wherein the adjusting is based on contextual logic received from a scene. Point interaction is to be understood as the user pointing at something and may comprise an intersection or interaction between an element, such as an interactable, and the directive ray 21,27, for example. Further, the sensitivity of gesture identification may be adjusted based on contextual information, where the adjusting may comprise adjusting a confidence value threshold. Adjusting may comprise snapping the directive ray to the interactable.

The contextual information, such as contextual information 312, may comprise interactable elements present in a scene, such as user interface UI sliders, switches and buttons, for example, in a scene information in extended reality XR. Information both on selection interaction and point interaction may be utilized to improve the directive ray 21 orientation, direction and movement. For example, a pinch inference threshold may be adjusted when directive ray 21 is pointing directly, or close to, a 'pinchable' interactable element. Similarly, the movement characteristics of the directive ray 21 may be altered with respect to an interactable element based on, for example, proximity to said interactable element. Such movement characteristics may be, for example, velocity of the directive ray 21 or user-experienced inertia or user-experienced momentum of the directive ray 21, which may be characterized or experienced by the user as 'stickiness' or 'gravity' of the directive ray 21. Further, the sensitivity of gesture identification may be adjusted based on the trajectory and/or velocity of the directive ray, where the adjusting may comprise adjusting a confidence value threshold. For example, if the trajectory is atypical, indicating for example uncontrolled movements by the user, the threshold for detecting a pinch may raised from, for example, 90% to 97%.

The at least one user action outputted by the event interpreter 380 is received by the scene within apparatus 360. The controller may be configured to generate a UI command based on the user action based at least in part on the determined user action. The controller 303 may be configured to transmit user interface command to an apparatus such as apparatus 360, and/or to store user interface command into the memory of controller 303.

An example of the operation of the system 300 comprising a head sensor 60, a wrist-wearable inertial measurement unit IMU 104 and a controller 103 is as follows: A user is using system 300 comprising a wrist-wearable IMU 104 on his hand, wherein hand may be, for example, a wrist, forearm, palm or back of hand and a head sensor capable of measuring head orientation. Said user is looking at point H1, his head is oriented towards said point H1, and his arm, comprising said a wrist-wearable IMU 104, is pointing down in direction W1. Said user performs an action, the action comprising: turning his head from point H1 to a direction H2, raising his hand to a lateral position, extending his forearm and pointing with index finger at point W2. The sensors of system 300 provide data during the action as follows:

- The head sensor 60 provides a data stream 316 comprising information on the orientation of the user's head. Thus, the head sensor comprises the measurement of change of orientation from point H1 to point H2 occurring during turning of the user's head.
- The wrist-wearable IMU 104 provides a gravity vector and a data stream 314 reflecting the orientation and movement of the wrist and/or hand of the user, in other words the hand trajectory of the user. Thus, the wrist-wearable IMU sensor measurement comprises the measurement of change in wrist-wearable IMU sensor orientation from point W1 to point W2.

The data streams 316 and 314 are obtained by the system 300, preferably a controller comprised 303 in said system. The data stream 316 obtained by the system from the head sensor 60 is used to compute a yaw component describing the position and orientation of user's head in relation to the wrist-wearable IMU in physical world coordinates, and consequently used to correct drift in wrist-wearable IMU sensor data stream. Concurrently, the data stream 314 obtained by the apparatus from the wrist-wearable IMU 104 is used to compute the normalized gravity vector and yaw component and pitch components of said wrist-wearable IMU 104 with respect to physical world coordinates. The yaw component of a directive ray 21 is obtained from the data stream of the wrist-wearable IMU 104 corrected for drift by combining the yaw component obtained from the wrist-wearable IMU 104, with a yaw component of the head sensor 60. The pitch component and the yaw component are combined and the resulting directive ray may be used to interact with interactables, and said resulting directive ray 21 may be displayed to the user through a computer monitor or a computer display, for example, a head mounted device worn by the user, the head mounted device comprising a display. By continuously, and/or consecutively updating the directive ray by re-computing the pitch and yaw components, a real-time or near real-time input from the user, and a real-time or near real-time visualization of a directive may be obtained. When the user moves his hand, and by extension the wrist-wearable IMU 104, yaw and pitch components of the directive ray 21 may be re-computed from data streams from the head sensor 60 and the wrist-wearable IMU 104.

Figure 6:
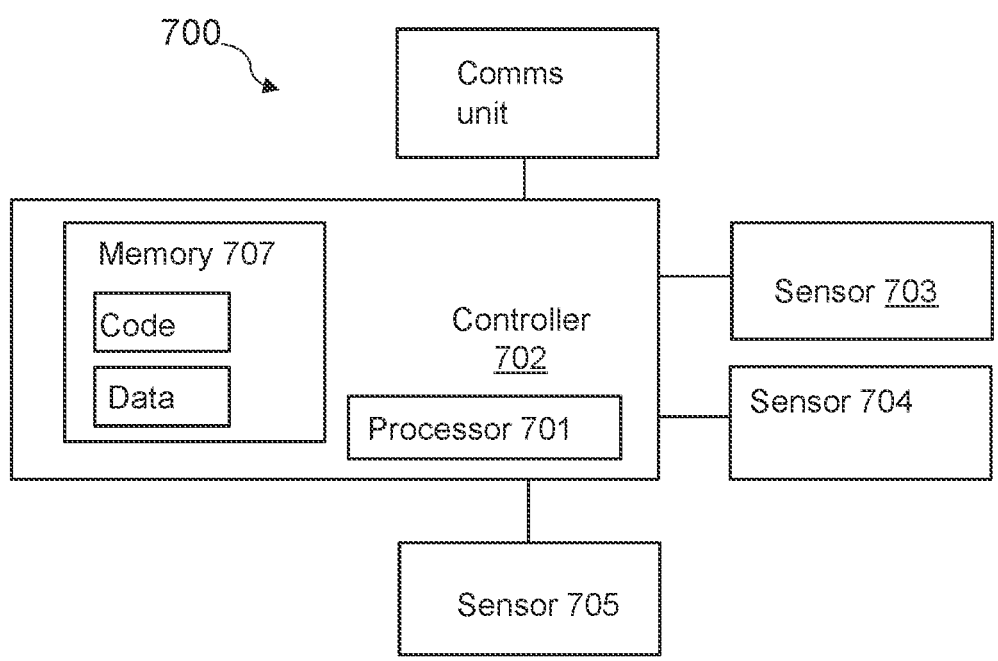
FIG. 6 illustrates a schematic view of an example apparatus capable of supporting at least some of the embodiments of the present invention.

FIG. 6 illustrates a system 700 capable of supporting at least some of the embodiments of the invention. System 700 may comprise a wrist-wearable apparatus, such as apparatus 170, and/or head apparatus 160.

The system 700 comprises a controller 702. The controller comprises at least one processor, and at least one memory including computer program code, and optionally data. The system 700 may further comprise a communication unit or interface. Such a unit may comprise, for example, a wireless and/or wired transceiver. The system 700 may further comprise sensors such as sensor 703, 704, 705, which are operatively connected to the controller. Said sensors may comprise an IMU. The system 700 may also include other elements not shown in FIG. 7.

Although the system 700 is depicted as including one processor, the system 700 may include more processors. In an embodiment, the memory is capable of storing instructions, such as at least one of: operating system, various applications, models, neural networks and/or, preprocessing sequences. Furthermore, the memory may include a storage that may be used to store, e.g., at least some of the information and data used in the disclosed embodiments.

Furthermore, the processor is capable of executing the stored instructions. In an embodiment, the processor may be embodied as a multi-core processor, a single core processor, or a combination of one or more multi-core processors and one or more single core processors. For example, the processor may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor may be configured to execute hard-coded functionality. In an embodiment, the processor is embodied as an executor of software instructions, wherein the instructions may specifically configure the processor to perform at least one of the models, sequences, algorithms and/or operations described herein when the instructions are executed.

The memory may be embodied as one or more volatile memory devices, one or more non-volatile memory devices, and/or a combination of one or more volatile memory devices and non-volatile memory devices. For example, the memory may be embodied as semiconductor memories (such as mask ROM, PROM (programmable ROM), EPROM (erasable PROM), flash ROM, RAM (random access memory), etc.).

The at least one memory and the computer program code may be configured to, with the at least one processor, cause the system 700 to at least perform as follows:
receive data from the one wrist-wearable IMU 104, the data comprising gravity information,
receive data from at least one head sensor 60 configured to measure the user (20), the data comprising for example a head orientation for the user, compute, based on the gravity information and based at least in part on the data
received from the head sensor 60, a yaw component of a directive ray 21, 27, compute a pitch component of the directive ray 21, 27, wherein computing the pitch is based at least in part on the gravity information, and
compute the directive ray 21, 27, wherein the directive ray 21, 27 is based on a combination of the computed yaw component and computed pitch component.

The at least one memory and the computer program code may be configured to, with the at least one processor, cause the system 700 to at least perform as follows:
receive data from the one wrist-wearable IMU 104, the data comprising gravity information,
receive data from at least one head sensor 60 configured to measure the user (20), in particular a head orientation for the user,
compute, based at least in part on the gravity information, a normalized gravity vector, compute, based on the normalized gravity vector and based at least in part on the data received from the head sensor 60, a yaw component of a directive ray 21, 27,
compute a pitch component of the directive ray 21, 27, wherein computing the pitch is based at least in part on the normalized gravity vector, and
compute the directive ray 21, 27, wherein the directive ray 21, 27 is based on a combination of the computed yaw component and computed pitch component.

The at least one memory and the computer program code may be configured to, with the at least one processor, cause the system 700 to at least perform as follows:
receive data from the one wrist-wearable IMU 104, the data comprising gravity information,
receive data from at least one head sensor 60 configured to measure the user (20), in particular a head orientation for the user, compute, based on the gravity information and based at least in part on the data
received from the head sensor 60, a yaw component of a directive ray 21, 27, compute the pitch component of the directive ray 21,27, wherein the pitch component is based at least in part on the gravity information, and pitch component is computed using a Madgwick filter configured to bias angular velocity correctness over orientation correctness.
compute the directive ray 21, 27, wherein the directive ray 21, 27 is based on a combination of the computed yaw component and computed pitch component.

A system, for example system 700, may be configured to transmit data, for example a directive ray data stream, user actions and/or user interface frames, wirelessly, for example using Bluetooth, to another device. The recipient of such a data transmission may include at least one of: the attached wearable device, any wearable device, a smartphone.

The present disclosure can also be utilized via the following clauses.

Clause 1. A non-transitory computer readable medium having stored thereon a set of computer readable instructions that, when executed by at least one processor, cause a system to at least:
measure, using at least one wrist-wearable inertial measurement unit and at least one head sensor, concurrent signals corresponding to at least one of movement, position or orientation of a user,
receive the measured concurrent signals in a controller comprising at least one processor and at least one memory including computer program code,
combine, by the controller, the received concurrent signals, and
generate, by the controller, a directive ray data stream based at least in part on characteristics of the combination of the received signals.

Clause 2. A system comprising a wrist-wearable apparatus, the apparatus comprising:
a strap,
a wrist-wearable measurement unit, IMU, 104,
a controller comprising at least one processor and at least one memory including computer program code, the at least one memory and the computer program code configured to with the at least one processor, to cause the controller at least to:
receive concurrent signals from a head sensor and the wrist-wearable IMU 104,
combine the received signals,
generate a directive ray data stream based at least in part on characteristics of the combination of the received signals.

Clause 3. A method for computing a directive ray, the method comprising:
  receiving data from at least one wrist-wearable IMU (104), the data comprising gravity information, receiving data from at least one head sensor (60), configured to measure the user (20), in particular a head orientation for the user,
  computing, based at least in part on the received gravity information and at least in part on the data received from the head sensor (60), a yaw component of a directive ray (21,27),
  computing a pitch component of the directive ray (21,27), wherein computing the pitch is based at least in part on the received gravity information, and
  computing a directive ray (21,27), wherein the directive ray (21,27) is based on a combination of the computed yaw component and computed pitch component.

Clause 4. A computer program configured to cause a method in accordance with clause 3 to be performed, where said program is storable on a non-transitory computer readable medium.

Advantages of the present disclosure include the following: The responsiveness of the directive ray 21 is increased, especially in embodiments where contextual logic is used to improve the ray direction. The embodiments of the present disclosure, by providing a more user-responsive ray, achieve the technical effect of providing extended usage durations before battery or user fatigue due to power, accuracy, ergonomic, comfort and/or cognitive factors. In other words, at least some embodiments provide high achievable task actions and/or user actions per time unit which in turn provides effective user-machine interaction.

The embodiments disclosed provide a technical solution to a technical problem. One technical problem being solved is onboard computation of an improved directive ray which takes into account application state and provides a high degree of usability, via for example anisomorphism. In practice, this has been problematic because wrist-worn devices must be quite light and not overly clunky, which limits the power storage and onboard processing power of such devices. However, offboard processing introduces lag to the system, which may result in a poorly responding directive ray.

The embodiments herein overcome these limitations by utilizing gravity information and received head orientation information from a second device to calculate the yaw of the ray. Further, the pitch is calculated based on said gravity information and gyroscope data. In this manner, the computation and provision of a directive ray can be accomplished in a more accurate and robust fashion. This results in several advantages. First, a directive ray with high responsiveness may be computed and provided to the XR system being used. Second, said ray may be provided at least in part by a wrist-wearable device, so the user does not need additional equipment to interact with the XR system. Third, the wrist-wearable device may be configured to further detect gestures performed by the user. Other technical improvements may also flow from these embodiments, and other technical problems may be solved.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in providing a user interface, for example relating to XR, for a controllable apparatus, such as a personal computer.

ACRONYMS LIST

ASIC application specific integrated circuit
AR augmented reality
CNN convolutional neural network DOF degrees of freedom
DSP digital signal processor
EPROM erasable PROM
EQ equation
FPGA field programmable gate array
HID human interface device
HMD head mounted device
HMI human-machine interface
IIR infinite impulse response
IMU inertial measurement unit
LRA linear resonance actuator
LSTM long short-term memory
MCU microcontroller unit
MEMS micro-electro mechanical systems
MR mixed reality
NN neural network
PCB printed circuit board
PROM programmable ROM
RNN recursive neural network
RAM random access memory
ROM read-only memory
UI user interface
VR virtual reality
XR extended reality

| REFERENCE SIGNS LIST | |
| --- | --- |
| 100, 101, 300, 399, 700 | system |
| 102, 162 | housing |
| 103, 163, 303 | controller |
| 104 | wrist-wearable inertial measurement unit IMU |
| 105 | mounting component |
| 160, 360 | head apparatus |
| 361 | scene information |
| 170 | wrist-wearable apparatus |
| 20 | user |
| 21 | isomorphic directive ray |
| 22 | user head orientation |
| 23 | user elbow point estimate |
| 24 | user wrist measurement point |
| 27 | anisomorphic directive ray |
| 60, 360, 61 | head sensor |
| 30 | selection plane |
| 31 | previous directive ray end-point |
| 32 | isomorphic cursor point |
| 33 | anisomorphic cursor point |
| 34 | hand trajectory |
| 35 | isomorphic shift in a selection plane |
| 36 | anisomorphic shift in a selection plane |
| 307 | classifier data stream |
| 210, 310 | directive ray data stream |
| 312 | scene information data stream |
| 114, 314 | wrist-wearable IMU data stream |
| 115 | wrist-wearable apparatus data stream |
| 116, 316 | head sensor data stream |
| 164 | head sensor inertial measurement unit IMU |
| 330, 350, 370 | model |
| 801, 802, 803A, 803B, 804, 805 | phases of a process |
| 901, 902, 903A, 903B, 904, 905 | phases of a process |

The invention claimed is:

1. A system comprising:
a wrist-wearable apparatus comprising:
a mounting component,
a controller comprising a processing core, at least one memory including computer program code; and
a wrist-wearable IMU configured to measure a user,
wherein the system is configured to:
receive data from the wrist-wearable IMU, the data comprising gravity information,
compute, based at least in part on the gravity information, a normalized gravity vector,
receive data from at least one head sensor configured to measure the user, said data comprising a head orientation for the user,
compute, based on the computed normalized gravity vector and based at least in part on the data received from the head sensor, a yaw component of a directive ray,
compute a pitch component of the directive ray, wherein computing the pitch component is based at least in part on the computed normalized gravity vector, and
compute the directive ray, wherein the directive ray is based on a combination of the computed yaw component and computed pitch component.

2. The system of claim 1, wherein the system further comprises a head apparatus comprising:
a mounting component,
a display unit, and
a head apparatus controller,
and wherein at least one of the head apparatus controller or the wrist-wearable apparatus controller is configured to receive the wrist-wearable IMU data and the head sensor data and to compute the yaw component, the pitch component and the directive ray.

3. The system of claim 2, wherein at least one of the head apparatus controller or the wrist-wearable apparatus controller is configured to provide a data stream representing the directive ray to a head apparatus and/or a computing device.

4. The system of claim 2, wherein the head apparatus comprises the head sensor, and wherein the head apparatus is configured to display, using the display unit, the computed directive ray.

5. The system of claim 1, wherein the computation of the directive ray is further based on contextual information received from a scene.

6. The system of claim 1, wherein the system is further configured to:
receive optical sensor data from the wrist-wearable apparatus, and
identify a selection gesture based on at least one of: the received optical data or the received IMU data,
wherein said identification is performed at least in part by a machine learning model, wherein the system comprises the machine learning model.

7. The system of claim 6, wherein the system is further configured to:
enable or disable the gesture identification responsive to a classification of the hand's trajectory, wherein the classification of the hand trajectory is done by a ballistic/corrective phase classifier.

8. The system of claim 1, wherein the system is further configured to compute a series of confidence values for each selection gesture and output said confidence values.

9. The system of claim 1, wherein system is further configured to adjust the sensitivity of the gesture identification based on received contextual information which comprises location information of an interactive element and/or proximity information with respect to the end-point of the directive ray and the location of the interactive element, wherein adjusting the sensitivity comprises adjusting a confidence value threshold using in the gesture identification.

10. The system of claim 1, wherein system is further configured to adjust the sensitivity of the gesture identification based on the trajectory of the directive ray, wherein adjusting the sensitivity comprises adjusting a confidence value threshold using the gesture identification.

11. The system of claim 1, wherein the system is further configured to align the directive ray to an origin point, wherein the coordinates of the origin point are determined by the orientation of the user's head or gaze (POV center) where the origin point equals the center of the user's field of view.

12. The system of claim 1, wherein the system is further configured to adjust detection thresholds of at least one point interaction based on the directive ray end-point, wherein the adjusting is based on contextual logic received from a scene.

13. The system of claim 1, wherein the system is further configured to reduce disturbance caused by measurement errors of a user's pointing posture by implementing a filter to improve the accuracy of the directive ray.

14. The system of claim 1, wherein the system is further configured to adjust the sensitivity of a machine learning model based on a previous selection history of the user.

15. The system of claim 1, wherein the system further incorporates a feature extraction module configured to analyze the sensor data stream and identify additional user actions beyond selection gestures.

16. The system of claim 1, wherein the directive ray is visualized as a bended curve at least between an interactive element and the wrist-wearable IMU.

17. The system of claim 1, wherein elbow location of the arm is estimated, and wherein the directive ray is aligned with the estimated elbow location and the location of the wrist-wearable IMU.

18. The system of claim 1, wherein the orientation of the directive ray is corrected using eye-tracking information.

19. The system of claim 1, wherein the system is configured to re-compute, based at least in part on the normalized gravity vector and based at least in part on the data obtained from the at least one wrist-wearable IMU, a yaw component of the directive ray if the directive ray is substantially parallel or antiparallel with respect to the normalized gravity vector.

20. A method for computing a directive ray, the method comprising:
receiving data from at least one wrist-wearable IMU, the data comprising gravity information,
computing, based at least in part on the gravity information, a normalized gravity vector,
receiving data from at least one head sensor, configured to measure the user, in particular a head orientation for the user,
computing, based on the normalized gravity vector, and based at least in part on the data received from the head sensor, a yaw component of a directive ray,
computing a pitch component of the directive ray, wherein computing the pitch is based at least in part on the computed normalized gravity vector, and
computing a directive ray, wherein the directive ray is based on a combination of the computed yaw component and computed pitch component.

21. The method of claim 20, the method further comprising displaying the computed directive ray using a display unit of a head apparatus, said head apparatus comprising:
a mounting component,
the display unit, and
a head apparatus controller,
and wherein at least one of the head apparatus controller or a wrist-wearable apparatus controller is configured to receive the wrist-wearable IMU data and the head sensor data and to compute the yaw component, the pitch component and the directive ray.

22. A non-transitory computer readable medium having stored thereon a set of computer readable instructions that, when executed by at least one processor, cause a system to at least:
receive data from at least one wrist-wearable IMU, the data comprising gravity information, receiving data from at least one head sensor, configured to measure the user, in particular a head orientation for the user,
compute, based at least in part on the gravity information, a normalized gravity vector,
compute, based at least in part on the normalized gravity vector and based at least in part on the data received from the head sensor, a yaw component of a directive ray,
compute a pitch component of the directive ray, wherein computing the pitch is based at least in part on the computed normalized gravity vector, and compute a directive ray, wherein the directive ray is based on a combination of the computed yaw component and computed pitch component.

23. A system comprising:
a wrist-wearable apparatus comprising:
a mounting component,
a controller comprising a processing core, at least one memory including computer program code; and
a wrist-wearable IMU configured to measure a user,
wherein the system is configured to:
receive data from the wrist-wearable IMU, the data comprising gravity information,
receive data from at least one head sensor configured to measure the user, said data comprising a head orientation for the user,
compute, based on the gravity information and based at least in part on the data received from the head sensor, a yaw component of a directive ray,
compute a pitch component of the directive ray using a Madgwick filter configured to bias angular velocity correctness over orientation correctness, and
compute the directive ray, wherein the directive ray is based on a combination of the computed yaw component and computed pitch component.

24. The system of claim 23, wherein the system further comprises a head apparatus comprising:
a mounting component,
a display unit,
a head sensor, and
a head apparatus controller,
and wherein at least one of the head apparatus controller or the wrist-wearable apparatus controller is configured to receive the wrist-wearable IMU data and the head sensor data and to compute the yaw component, the pitch component and the directive ray, and wherein the head apparatus is configured to display, using the display unit, the computed directive ray.

25. A method for computing a directive ray, the method comprising:
receiving data from at least one wrist-wearable IMU, the data comprising gravity information,
receiving data from at least one head sensor, configured to measure the user, in particular a head orientation for the user,
computing, based on the gravity information, and based at least in part on the data received from the head sensor, a yaw component of a directive ray, computing a pitch component of the directive ray using a Madgwick filter configured to bias angular velocity correctness over orientation correctness, and computing a directive ray, wherein the directive ray is based on a combination of the computed yaw component and computed pitch component.

26. The method of claim 25, the method further comprising displaying the computed directive ray using a display unit of a head apparatus, said head apparatus comprising:
   a mounting component,
   the display unit, and
   a head apparatus controller,
and wherein at least one of the head apparatus controller or a wrist-wearable apparatus controller is configured to receive the wrist-wearable IMU data and the head sensor data and to compute the yaw component, the pitch component and the directive ray.

* * * * *